United States Patent
Aylett et al.

(10) Patent No.: US 11,204,918 B2
(45) Date of Patent: Dec. 21, 2021

(54) SYSTEMS AND METHODS FOR ACCESSING A DATABASE MANAGEMENT SYSTEM

(71) Applicant: GLOBAL SOFTWARE INNOVATION PTY LTD, Baulkham Hills (AU)

(72) Inventors: Peter Kyra Aylett, North Ryde (AU); David Gregory Quint, Kariong (AU); Scott Hopwood, West Pymble (AU)

(73) Assignee: GLOBAL SOFTWARE INNOVATION PTY LTD, Baulkham Hills (AU)

( * ) Notice: Subject to any disclaimer, the term of this patent is extended or adjusted under 35 U.S.C. 154(b) by 137 days.

(21) Appl. No.: 16/334,507

(22) PCT Filed: Sep. 6, 2017

(86) PCT No.: PCT/AU2017/000186
§ 371 (c)(1),
(2) Date: Mar. 19, 2019

(87) PCT Pub. No.: WO2018/053568
PCT Pub. Date: Mar. 29, 2018

(65) Prior Publication Data
US 2021/0286815 A1    Sep. 16, 2021

(30) Foreign Application Priority Data
Sep. 20, 2016 (AU) ................................ 2016231506

(51) Int. Cl.
*G06F 16/2452* (2019.01)
*G06F 16/2453* (2019.01)
(Continued)

(52) U.S. Cl.
CPC .... *G06F 16/24526* (2019.01); *G06F 16/2445* (2019.01); *G06F 16/24535* (2019.01);
(Continued)

(58) Field of Classification Search
CPC ......... G06F 16/24526; G06F 16/24535; G06F 40/205; G06F 16/2445; G06F 16/24539; G06F 16/288
See application file for complete search history.

(56) References Cited

U.S. PATENT DOCUMENTS 5,706,494 A *  1/1998  Cochrane ............. G06F 16/284
7,523,462 B1 * 4/2009  Nesamoney ........ G06F 16/2458
                                                                   719/318
(Continued)

FOREIGN PATENT DOCUMENTS

EP         2731023 B1       3/2015

OTHER PUBLICATIONS

Global Software Innovation PTY LTD; International Patent Application No. PCT/AU2017/000186; International Search Report; dated Oct. 9, 2017; (3 pages).

*Primary Examiner* — Matthew Ell
*Assistant Examiner* — Lana Alagic
(74) *Attorney, Agent, or Firm* — Dority & Manning, P.A.

(57) ABSTRACT

Disclosed is a method of accessing a network of relationship instances and data field values of entity instances in a combined entity relationship- and relational-model database management system. The method comprises the steps of receiving a query that natively references relationship types including data fields to be accessed; parsing the query into a parse tree; converting the parse tree to a query graph; optimising the query graph by consolidating equivalent nodes in the query graph; analysing the nodes in the optimised query graph; codifying each node of the optimised query graph into a first table of state transition rules; codifying the data fields to be accessed into a second table of field rules; preparing a query that includes the first and second tables; identifying entity instances to be accessed by the prepared query by iteratively following relationship (Continued)

instances according to the first table; and loading data fields of the identified entity instances according to the second table.

10 Claims, 22 Drawing Sheets

(51) Int. Cl.
    *G06F 16/242*     (2019.01)
    *G06F 40/205*     (2020.01)
    *G06F 16/28*     (2019.01)

(52) U.S. Cl.
    CPC ...... *G06F 16/24539* (2019.01); *G06F 40/205* (2020.01); *G06F 16/288* (2019.01)

(56) References Cited

U.S. PATENT DOCUMENTS

2008/0016029 A1\*   1/2008   John  ................ G06F 16/24542
2011/0295788 A1   12/2011   Kowalski \* cited by examiner

1000A

| Node | Key |
|---|---|
| 905 | Outgoing relationship type: Owner, Reviewer; Data Field: projectname |
| 910 | Outgoing relationship type: (none); Data Field: email |
| 915 | Outgoing relationship type: department; Data Field: (none) |
| 920 | Outgoing relationship type: (none); Data Field: email |
| 925 | Outgoing relationship type: department; Data Field: (none) |
| 930 | Outgoing relationship type: (none); Data Field: name |
| 935 | Outgoing relationship type: (none); Data Field: name |

| Node | Key |
|---|---|
| 905 | Outgoing relationship type: Owner, Reviewer; Data Field: projectname |
| 910 | Outgoing relationship type: (none); Data Field: email |
| 915 | Outgoing relationship type: department; Data Field: (none) |
| 930 | Outgoing relationship type: (none); Data Field: name |

Fig. 10B

| Node | Key |
|---|---|
| 905 | Inbound relationship type: (none) |
| 910 | Inbound relationship type: owner, reviewer |
| 915 | Inbound relationship type: owner, reviewer |
| 930 | Inbound relationship type: department |

| Node | Key |
|---|---|
| 905 | Inbound relationship type: (none) |
| 910 | Inbound relationship type: owner, reviewer |
| 930 | Inbound relationship type: department |

SYSTEMS AND METHODS FOR ACCESSING A DATABASE MANAGEMENT SYSTEM

This application is a National Stage Patent Application of PCT/AU2017/000186, filed on Sep. 6, 2017, which claims the benefit of priority to Australian Patent Application No. 2016231506, filed on Sep. 20, 2016, the disclosures of all of which are incorporated by reference herein in their entireties.

TECHNICAL FIELD

The present invention relates generally to databases and, in particular, to a query language for a database management system having a combined entity-relationship and relational data model.

BACKGROUND

A database management system with a combined entity-relationship (ER) and relational data model typically has performance issues as well as maintenance overhead when acquiring data fields from the database management system.

A query language is typically used to access the data fields from the database management system by first specifying a root entity instance and a network of relationship types that should be followed to one or more target entities to acquire the requested data fields from the target entities. A problem, however, arises when the queries are complex because, when each relationship type is followed, there are multiple relationship type paths leading to each target entity type, resulting in a large amount of duplicate data fields being accessed.

One alternative option for the query language is to query the set of data fields of an entity instance and relationship types individually in order to determine the exact set of data fields and relationship types to access on target entities. However, the alternative option requires multiple queries to the database server, which negatively impacts on performance substantially.

Thus, a need exists for a query language, and a system and method for the processing and execution of those queries, that enables for simpler queries and more efficient processing.

SUMMARY

It is an object of the present invention to substantially overcome, or at least ameliorate, one or more disadvantages of existing arrangements. We present the term ReadiNow Intelligent Engines (RIE) to refer to the introduced technology.

According to a first aspect of the present disclosure, there is provided a method of accessing a network of relationship instances and data field values of a group of entity instances in a combined entity relationship- and relational-model database management system, the method comprising the steps of: receiving a query text that natively references relationship types including the network of relationship types and data fields to be accessed; parsing the query text into a parse tree; converting the parse tree to a query graph; optimising the query graph by combining nodes in the query graph, the combined nodes being nodes with equivalent actions or incoming relationship types; analysing the nodes in the optimised query graph; encoding inbound and outgoing relationship types, a source node, and a target node to be accessed for each node of the optimised query graph into a first table of state transition rules; encoding the data fields to be accessed for each node into a second table of field rules; preparing a structured query language (SQL) query that includes the first and second tables; identifying entity instances to be accessed by the prepared SQL query by applying a state-machine technique to iteratively follow relationship instances according to the first table, wherein entity instances identified in each iteration are simultaneously processed in the subsequent iteration; and loading data fields of the identified entity instances according to the second table.

According to a second aspect of the present disclosure, there is provided a computer program product comprises program instructions for causing a computer to perform the above described method.

Other aspects are also disclosed.

BRIEF DESCRIPTION OF THE DRAWINGS

At least one embodiment of the present invention will now be described with reference to the drawings and appendices, in which:

FIGS. 10A and 10B are example tabular representations of the optimisation process being applied to the query graph of FIG. 9.

Figure 8:
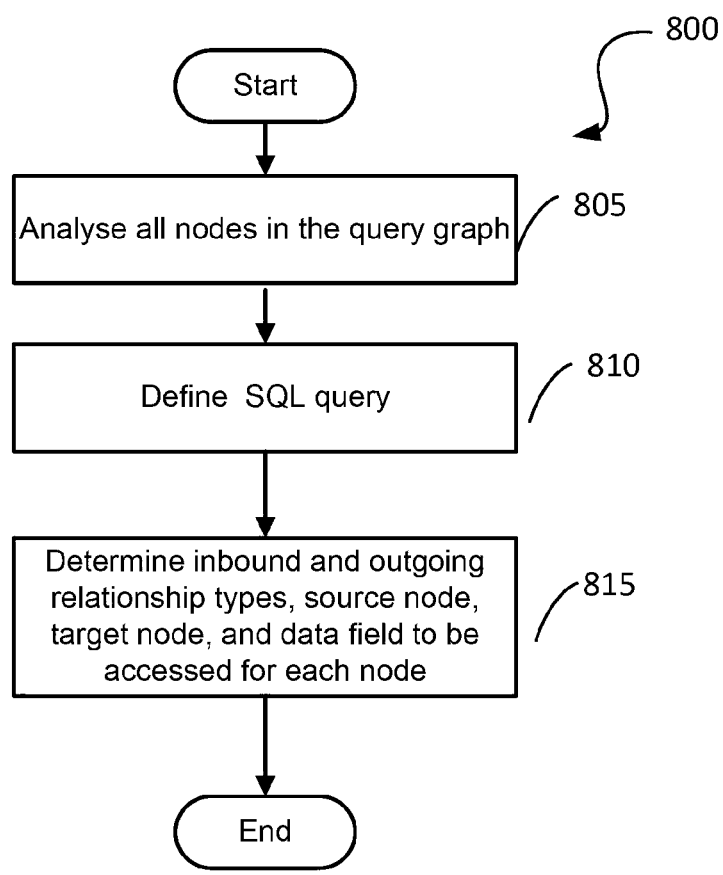
FIG. 8 is a flow diagram of a method for generating a SQL query mechanism.

Appendix A is an example of the SQL query generated by the method shown in FIG. 8.

DETAILED DESCRIPTION INCLUDING BEST MODE

Where reference is made in any one or more of the accompanying drawings to steps and/or features, which have the same reference numerals, those steps and/or features have for the purposes of this description the same function (s) or operation(s), unless the contrary intention appears.

The query language described herein is designed for accessing a database and associated data held in a database management system employing a combined ER and relational data model. When a device requests access to the data in the database, the disclosed query language returns a portion of the database together with the associated data to the requesting device. The requesting device can then access the data from the returned portion of the database.

The query language is efficient through its capability of combining ER paths when accessing (i.e., updating or retrieving) the database from the database management system. Such a combining of ER paths enable the database access to use less server processing power. Further, the amount of duplicate data fields being returned from the database management system would also be reduced due to the combined ER paths.

One example of a conventional query language is the Structured Query Language (SQL), which is capable of managing data fields in a relational-model database management system. However, the combination of ER- and relational-models means that the query language must traverse both models to access the combined database management system.

One example data structure of a combination ER- and relational-model database management system includes an entity table listing the entity instances of the database. For example, the table can be arranged in multiple rows and columns, so that one row of the table stores an entity instance and data fields associated with that entity instance, such that the data fields are stored on the same row but on different columns.

An entity instance is an instance of an entity type. Examples of entity types are employees, projects, clients, contracts, risks, and the like. Examples of entity instances are specific instances of the same, such as specific clients and specific contracts. Examples of data fields relating to an entity instance are names, dates, amounts, relationship instance linking the entity instance to another entity instance, and the like. Alternatively, the data fields may be stored in one or more separate tables. In the alternative arrangement, the one or more separate tables may store each data field in one row of the one or more separate tables.

A relationship instance relates an entity instance to another entity instance. More specifically, an entity instance (e.g., a specific client) of a particular entity type (e.g., client) may be related to another entity instance (e.g., a specific project) of another entity type (e.g., a project), via a relationship instance (e.g., a specific relationship between the specific client and the specific project) of a particular relationship type (i.e., a type of the specific relationship). For example, an employee (i.e., an entity instance) can be related to a project (i.e., an entity instance) via a relationship instance, which may have a relationship type named 'project-employee'.

The combined ER and relational database may be configured so that there is an interconnected schema between entity types and relationship types. The database may then be created using an interconnected network of data consisting of entity instances and relationship instances. The entity instances and relationship instances can then be traversed when obtaining data fields from specific entity instances for the purpose of presenting reports, running workflows, and the like.

Figures 5A, 5B:
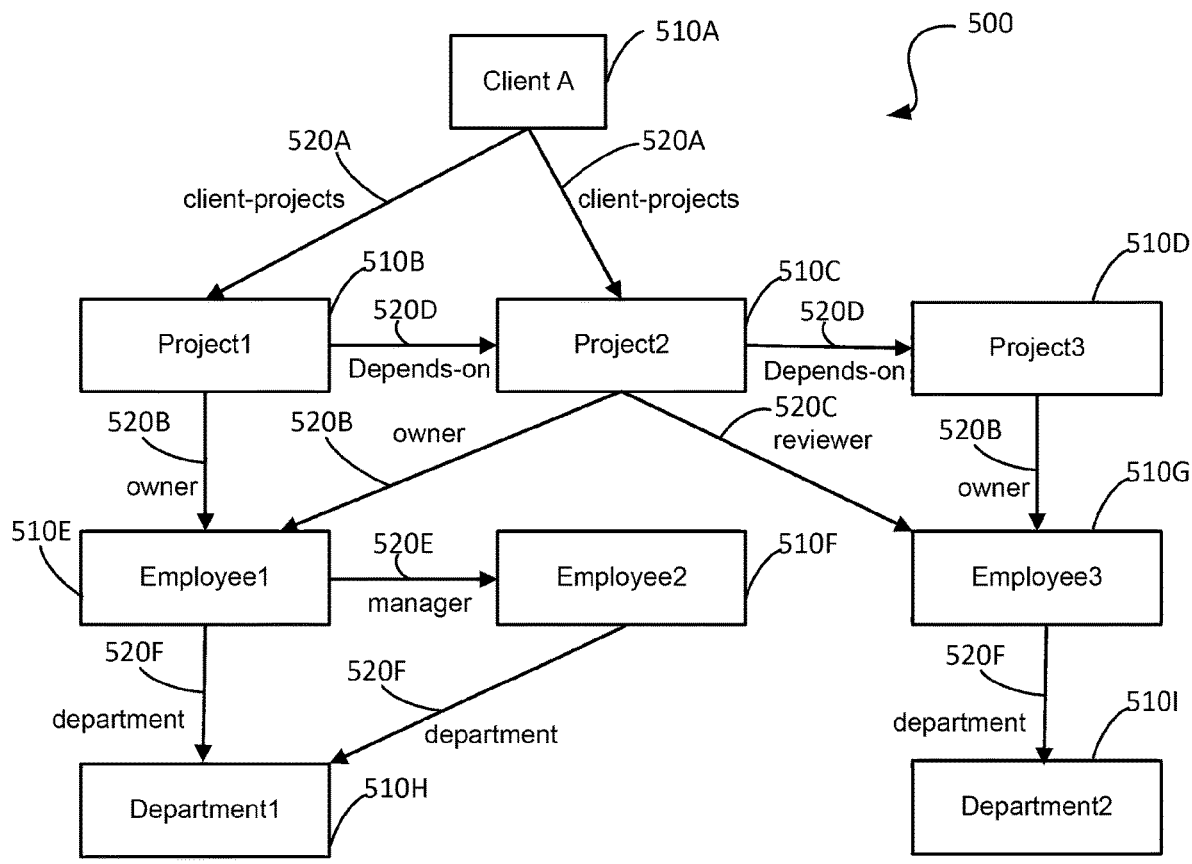
FIG. 5A is an example of an entity relationship model.
FIG. 5B is a relationship table of the relationship instances represented in FIG. 5A.

FIG. 5A is an example of an ER-model 500. As shown in FIG. 5, the ER-model 500 includes entity instances 510A, 510B, 510C, 510D, 510E, 510F, 510G, 510H, and 510I (shown as rectangular boxes), and relationship instances 520A, 520B, 520C, 520D, 520E, and 520F (shown as arrows with the relationship type recited next to the respective arrow).

Each of the entity instances 510A to 510I will be generically referred to as the entity instance 510 hereinafter and the entity instances 510A to 510I will be collectively referred to as the entity instances 510.

Each of the relationship instances 520A to 520F will be generically referred to as the relationship instances 520 hereinafter and the relationship instances 520A to 520F will be collectively referred to as the relationship instances 520.

FIG. 5B shows a relationship table 540 representing the ER-model 500. Each row 550 of the relationship table 540 represents a relationship instance 520 having a From Entity field 552, a To Entity field 554, and a Relationship Type field 556. In implementing the relationship table 540, the data contained within each of the fields 552, 554, and 556 are typically assigned with an identification number.

As shown in FIG. 5A, an entity instance 510 is related to at least another entity instance 510 via a relationship instance 520. For example, the entity instance 510A of "Client A" is related to both the entity instances "Project1" 510B and "Project2" 510C via a relationship instance 520A of a relationship type "client-projects".

Figure 5C:
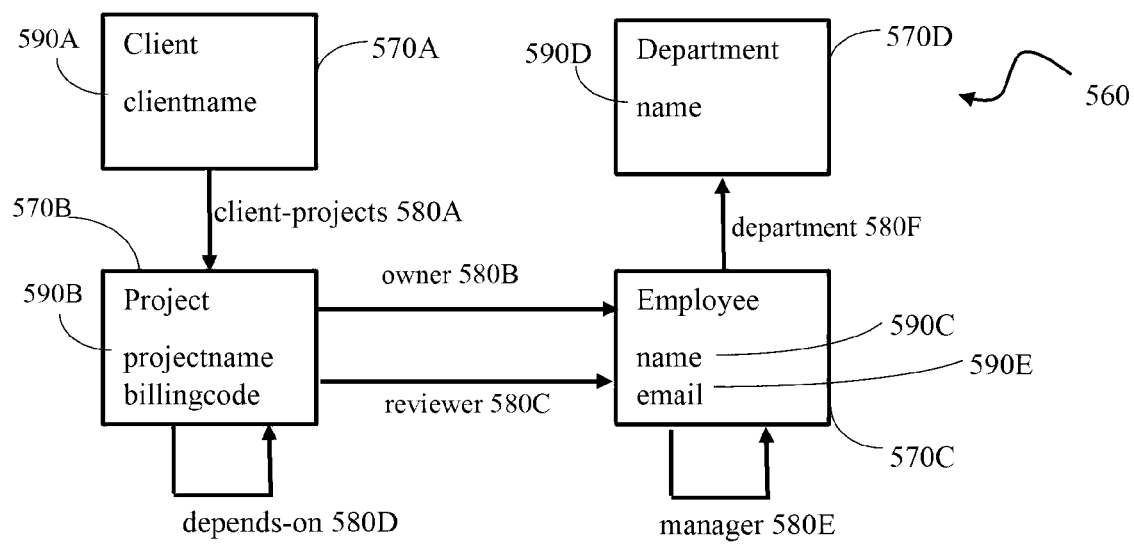
FIG. 5C is an entity relationship schema that shows the entities types and relationship types that are possible.

FIG. 5C is an example of an ER-schema 560 including entity types 570A, 570B, 570C, and 570D (shown as rectangular boxes); relationship types 580A, 580B, 580C, 580D, 580E, and 580F (shown as arrows with the relationship type name recited next to the respective arrow); and data fields 590A, 590B, 590C, 590D, and 590E (shown as text within each rectangular box, below the entity type name). The ER-schema 560 represents the types of entity instances that are permissible in the ER-model; the types of relationship instances that are permissible between entity instances of particular entity types; and the field data that is permissible on entity instances of each entity type. The schema 560 is the schema on which the ER-model 560 is built.

Each of the entity types 570A to 570D will be generically referred to as the entity type 570 hereinafter and the entity types 570A to 570D will be collectively referred to as the entity types 570.

Each of the relationship types 580A to 580F will be generically referred to as the relationship type 580 hereinafter and the relationship types 580A to 580F will be collectively referred to as the relationship types 580.

Overview

The combination ER- and relational-model database management system may be implemented on a cloud platform that is capable of providing a web-based service that enables users to create and customize the users' web or desktop software applications without the need for computer programming or other technical knowledge. The cloud platform also provides other functionalities such as backup, security, scalability, and the like.

The cloud platform enables users to build software applications by either writing the applications or choosing from a suite of customizable pre-written applications. The software applications may be directed towards customer relationship management, business continuity management, expense tracking, and the like.

The software applications include various graphical user interface software modules, such as dashboards, data entry forms, reports, charts and the like, as well as interactivity modules such as running workflows, triggering business processes, importing and exporting data, template document generation, email notifications, and the like.

Figure 1A:
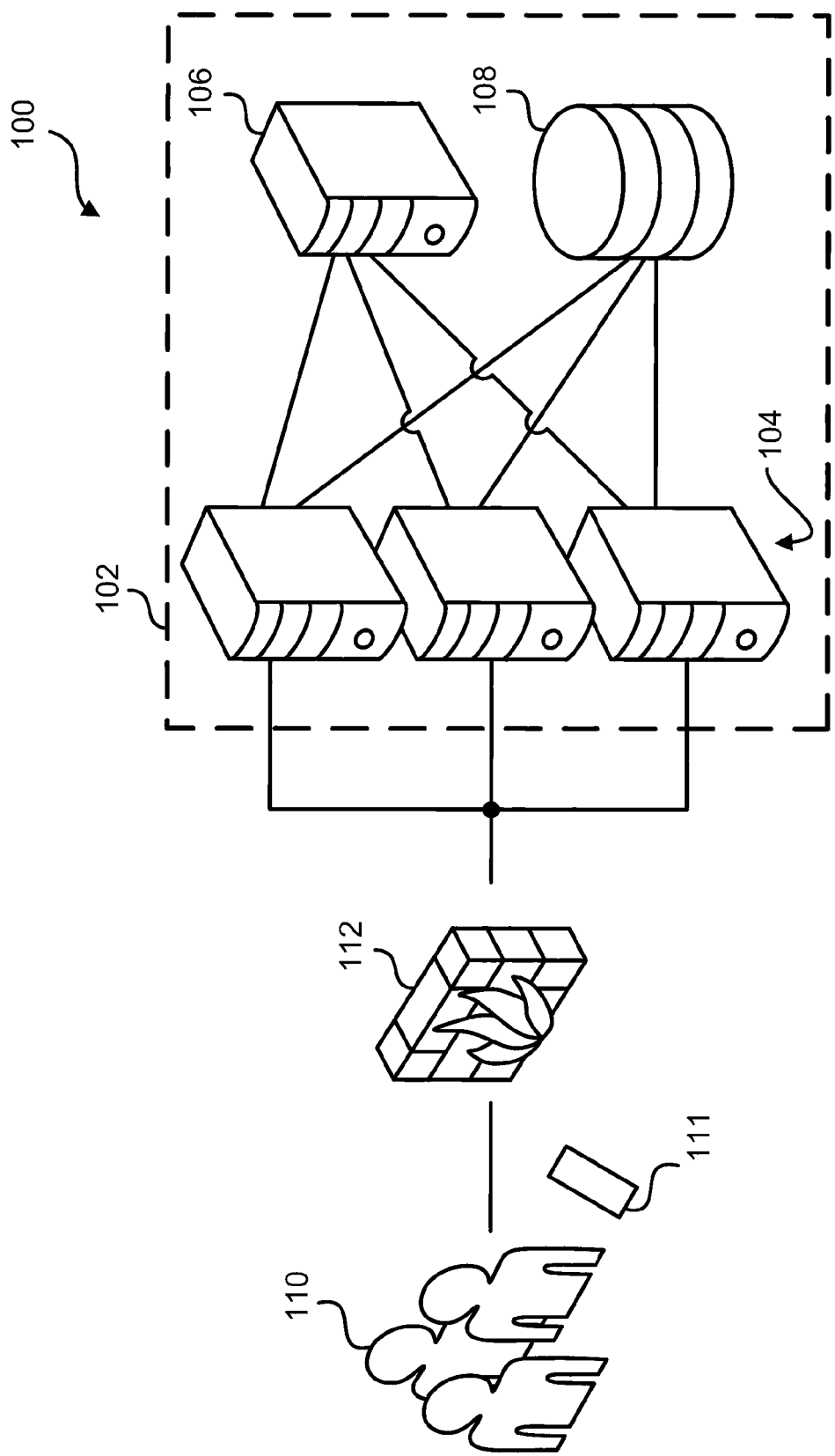
FIG. 1A shows a computer network structure in which the present invention can be implemented.

FIG. 1A is a schematic diagram illustrating the physical infrastructure 100 of a cloud platform 102. The cloud platform 102 is arranged in an N-tier architecture including a plurality of front end web servers 104, a cache server 106, and a database server 108. The cloud platform 102 receives requests from users 110 using a user device such as a smartphone 111, for example, by an application delivery controller (ACD) 112 that routes requests to the front-end web server 104.

The database server 108 stores the combined ER- and relational-model database management system, and the cache server 110 stores pre-calculated queries for acquiring data fields quickly.

Figure 1B:
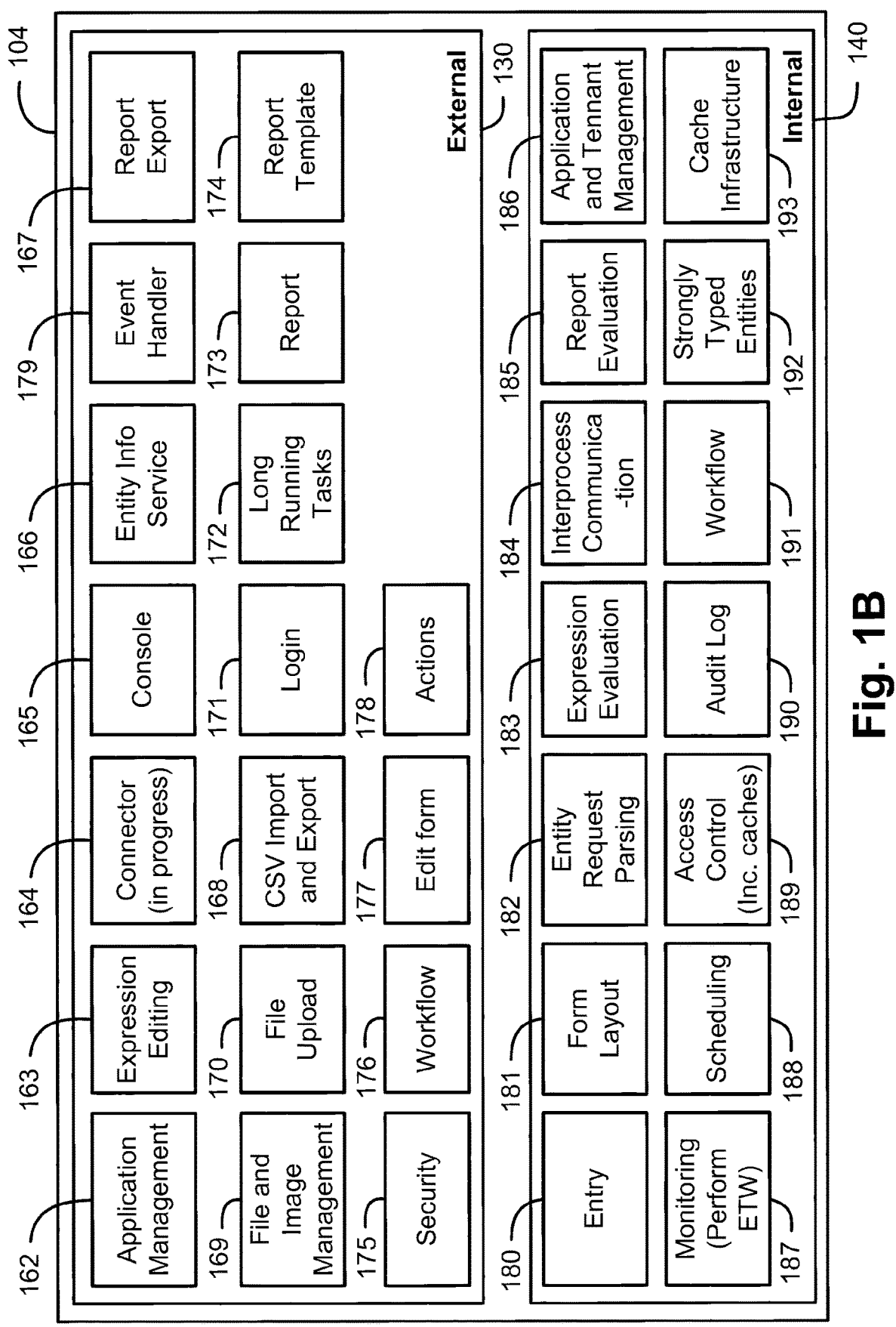
FIGS. 1B and 1C show examples of software components implemented on the computer network structure of FIG. 1A.

The majority of the platform software resides on the front-end web servers 104. FIG. 1B is a block diagram of the front-end web servers 104 depicting a number of internal software modules 140 and external software modules 130. The external software modules 130 are modules exposed by the front-end web servers 104 to support client-side (web browser) code, whereas the internal software modules 140 are configured to support various internal features.

The external software modules 130 may include an application management module 162 that enables the installation/removal/management of software applications, an expression editing module 163 that allows syntax checking for calculations that a user can enter when editing reports, and a connector module 164 that enables the cloud platform 102 to interoperate with other online systems by exposing a data communication application programming interface (API). A console module 165 for loading user interface elements such as navigation links and sections, and an entity information service 166 for reading and writing entity-relationship data for communication between the client devices 110 and the front-end web servers 104 may also be provided.

The external software modules 130 may also include a report export module 167 that provides a tabular report to be converted into a CSV (comma separated variables) or Excel file, a CSV/Excel import module 168 that allows tabular data to be imported into the database server 108 as entities, a file and image management module 169 that supports tracking and download of documents, files, and images for storing in the ER model, and a file upload module 170 that uploads files by breaking the files into multiple chunks, reassembling the chunks on the server 104, and storing the files in the database server 108. Other external modules may include a login module 171 for handling user login, authentication, lockout policy, password policy, encryption, etc., and a long running tasks module 172 for tracing a time-consuming process, such as importation of a large data set.

The external software modules 130 further include a reports module 173 that enables database queries to be graphically constructed, a document templates module 174 that enables macro-style Word templates to drive automated document generation, a security module 175 that enables access rules to be configured to control access to entities, a workflow module 176 that enables users to design business processes as flow charts, which can then be triggered when certain events are detected (for example, if the user presses a certain button).

An edit form module 177 enables developers to build data entry forms, and present those forms to end users and an actions module 178 allows application developers to control the activities performed on entities, for example through a right-click context menu. The activities may include editing/deleting a resource, starting a workflow, or generating a document.

The internal modules 140 include an event handler module 179 for detecting low level changes in the ER model and performing internal code activities when the changes are detected, an entity module 180, which represents the ER model, and a form layout module 181 for generating default edit forms from database schema objects. An entity request parsing module 182 is provided for accepting a request from the entity information service module and converting the text into an object structure for processing. An expression evaluation module 183 for performing the actual calculation process for calculations that have been entered into workflows or reports, an inter-process communications module 184 for allowing the front-end web servers 104 to communicate with each other (primarily to notify each other of data changes), and a report evaluation module 185 for converting reports into SQL database server queries, and formatting the results are also provided.

The internal software modules 140 may include an application and tenant management module 186 that supports application management, a monitoring module 187 that collects system diagnostics information, and a scheduling module 188 for scheduling activities (such as running a workflow) to occur at certain times. An access control module 189 may also be provided to implement and enforce internal security rules. Other internal modules 130 may include an audit log module 190 to detect and record security sensitive events, a workflow module 191 to implement the actual execution of a workflow, a strongly typed entities module 192 that allows an entity schema to be defined in XML and generates source code to allow programmers to program against those entities, and a cache infrastructure module 193 for caching internal server data, such as entity information, report results and so on.

In many cases, the software modules 130 and 140 may be interconnected with and depend on each other. Although FIG. 1B clearly distinguishes between internal and external software modules 130 and 140, the boundary between the modules 130 and 140 may sometimes be fuzzy.

The database server 108 hosts multiple clients (tenants). Each storage area for each tenant can have different versions of different applications installed. Separate from the tenants, an application library hosts every available version of every available application. User data is also stored within the storage area associated with each tenant.

Figure 1C:
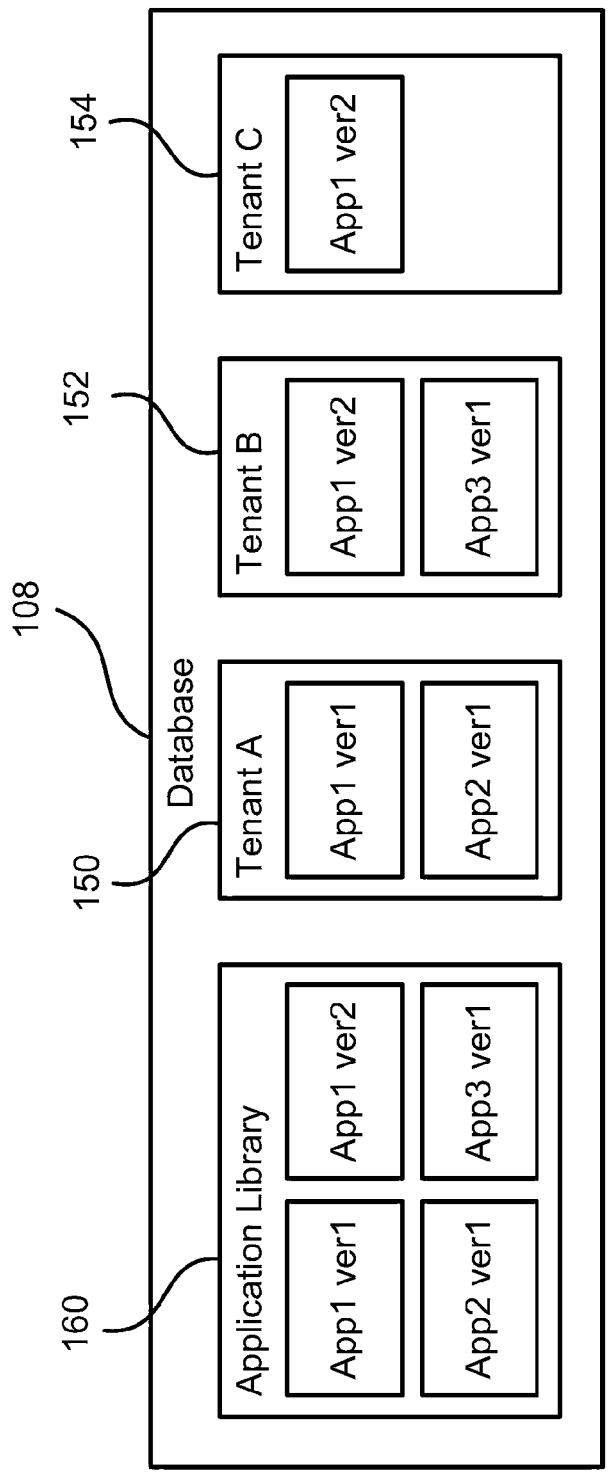

FIG. 1C depicts a block diagram of an exemplary database server 108, including storage areas 150, 152, and 154 for three tenants and an application library 160. A single set of database tables holds all ER data fields for all tenants.

All user data is represented as entity instances and relationship instances, as described above. Additionally, all application components are described in the ER model.

Moreover, the schema (or metadata) about the application is also described using entity instances and relationship instance to define the entity types that are possible; the fields that they may possess; the relationship types that are defined; and rules for validating input.

The unique structure means that all software modules developed to power the cloud platform 102 equally enrich the user's web-based applications, and vice versa.

As described previously, the above database management system runs on the cloud platform 102. Additionally, a body of code (a software client) is sent to and runs on the user's web browser. This code is configured to provide a user interface for the dynamically generated applications. For application developers, this code can also support application building.

The software client is structured as a single paged application (SPA), whereby all code is loaded up front, and communication only goes back to the cloud platform 102 to fetch or modify data.

Front End Web Server Description

Figure 2A:
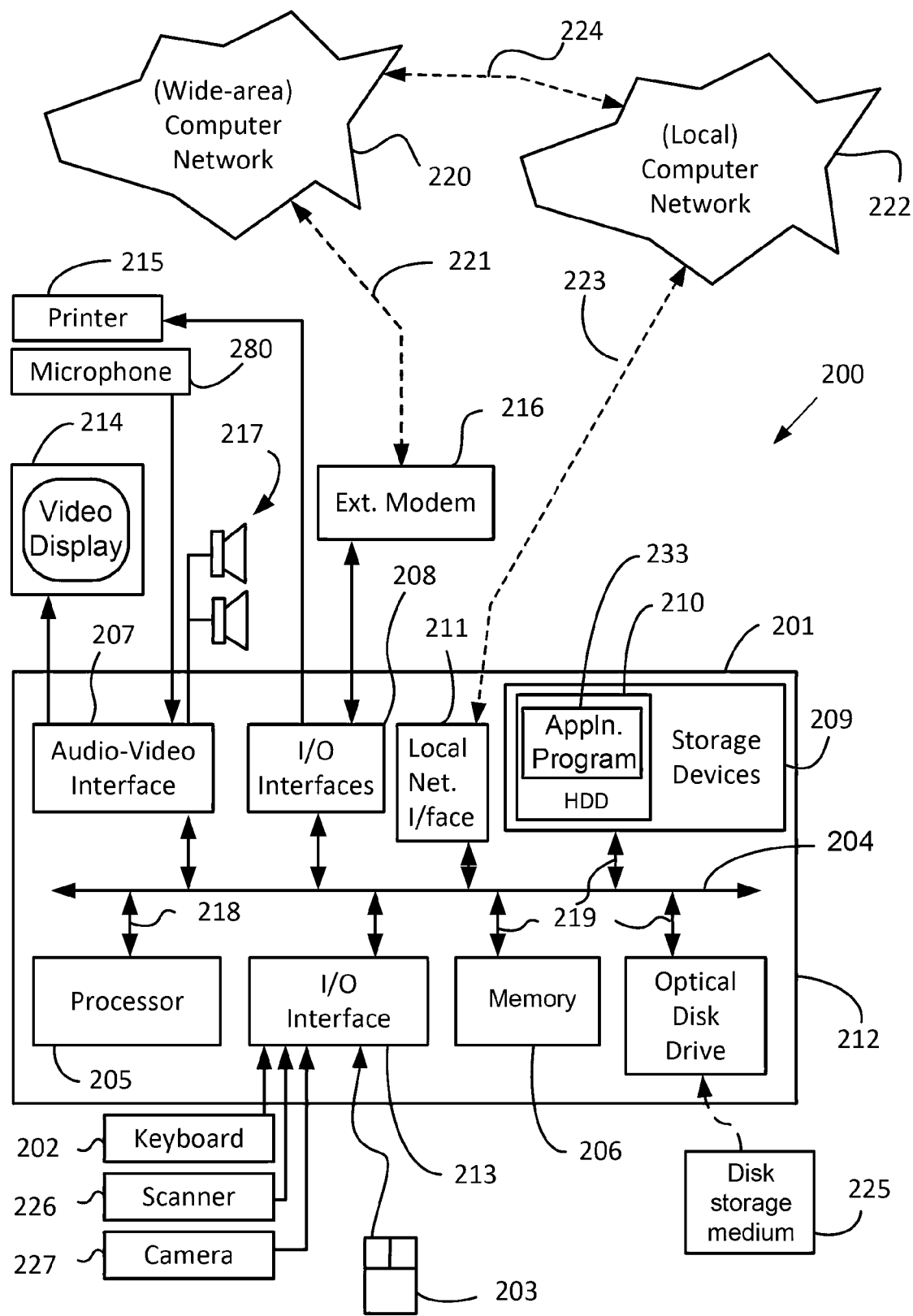
FIGS. 2A and 2B collectively form a schematic block diagram representation of an electronic device upon which described front end web server can be practised.
Figure 2B:
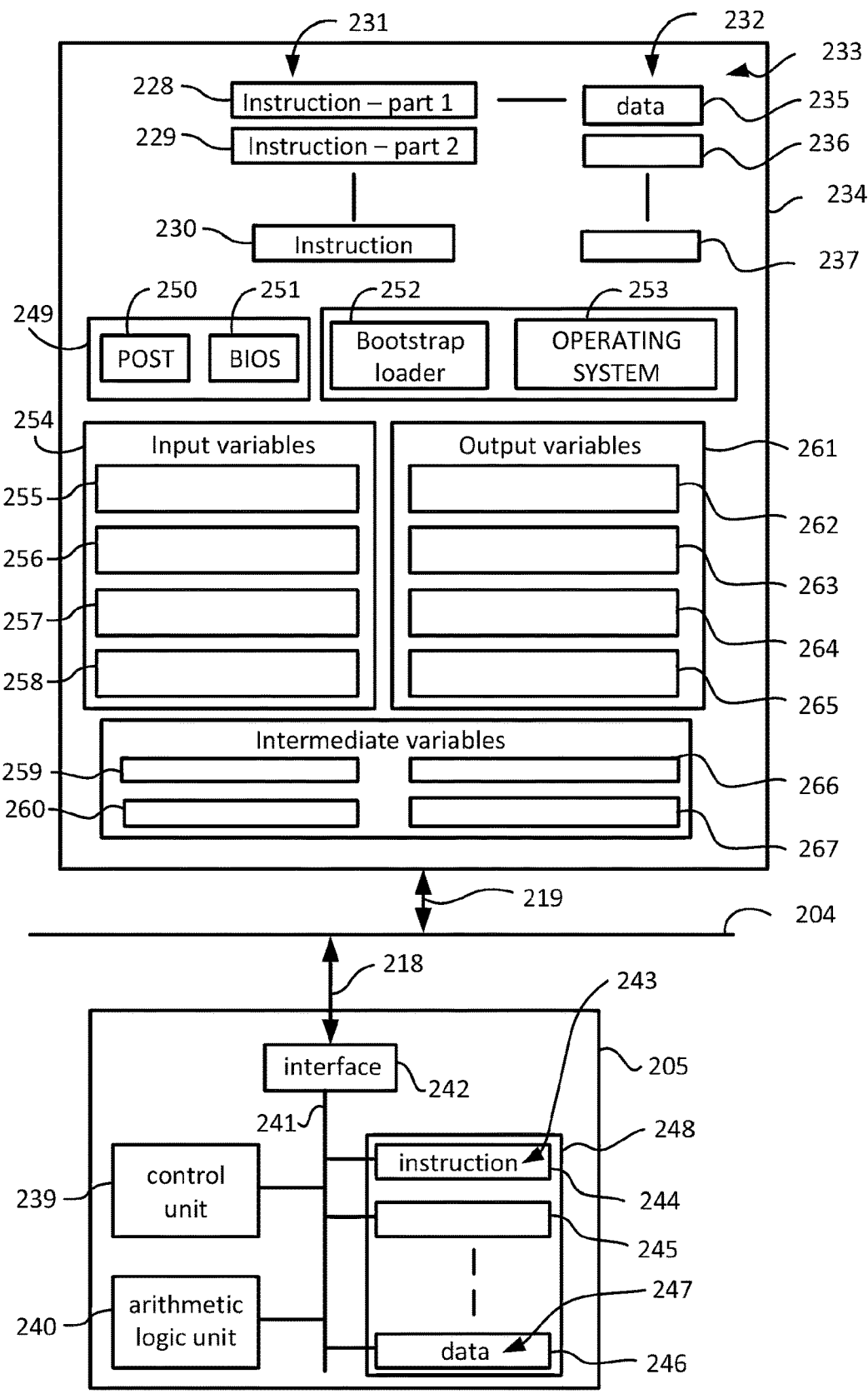

FIGS. 2A and 2B depict a general-purpose computer system 200, upon which the front end web servers 104 can be practiced.

As seen in FIG. 2A, the computer system 200 includes: a computer module 201; input devices such as a keyboard 202, a mouse pointer device 203, a scanner 226, a camera 227, and a microphone 280; and output devices including a printer 215, a display device 214 and loudspeakers 217. An external Modulator-Demodulator (Modem) transceiver device 216 may be used by the computer module 201 for communicating to and from a communications network 220 via a connection 221. The communications network 220 may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet circuit card, a Bluetooth® wireless arrangement or an IEEE 802.11 wireless arrangement; however, numerous other types of interfaces may be practiced for the interface 211.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g., CD-ROM, DVD, Btu-ray Disc™), USB-RAM, portable, external hard drives, and floppy disks, for example, may be used as appropriate sources of data to the system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun Sparcstations, Apple Mac™ or like computer systems.

The method of accessing the combined ER- and relational-model database management system may be implemented using the computer system 200 wherein the processes of FIGS. 4, 7A-7C, and 8, to be described, may be implemented as one or more software application programs 233 executable within the computer system 200. In particular, the steps of the method of accessing the combined ER- and relational-model database management system are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the ER- and relational-model database management system access methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for accessing the ER- and relational-model database management system.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212. A computer readable medium having such software or computer program recorded on it is a computer program product. The use of the computer program product in the computer system 200 preferably effects an apparatus for accessing the ER- and relational-model database management system.

In some instances, the application programs 233 may be supplied encoded on one or more CD-ROMs 225 and read via the corresponding drive 212, or alternatively may be read from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of software, application programs, instructions and/or data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The disclosed arrangements use input variables 254, which are stored in the memory 234 in corresponding memory locations 255, 256, 257. The arrangements produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

a fetch operation, which fetches or reads an instruction 231 from a memory location 228, 229, 230;

a decode operation in which the control unit 239 determines which instruction has been fetched; and an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the processes of FIGS. 4, 7A-7C, and 8 is associated with one or more segments of the program 233 and is performed by the register section 244, 245, 247, the ALU 240, and the control unit 239 in the processor 205 working together to perform the fetch, decode, and execute cycles for every instruction in the instruction set for the noted segments of the program 233.

User Device Description

Figure 3A:
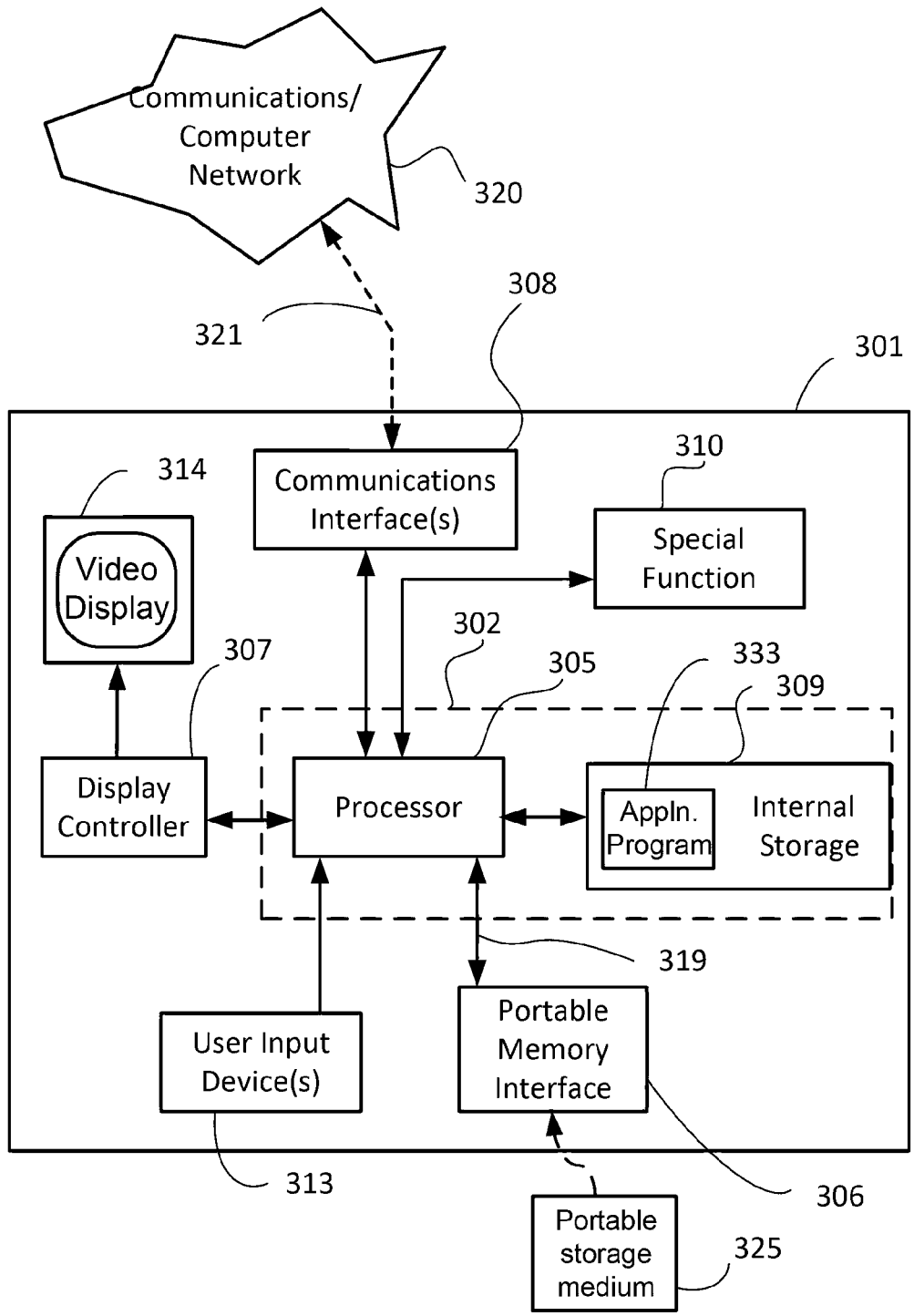
FIGS. 3A and 3B form a schematic block diagram of a general purpose computer system upon which a user device can be practiced.
Figure 3B:
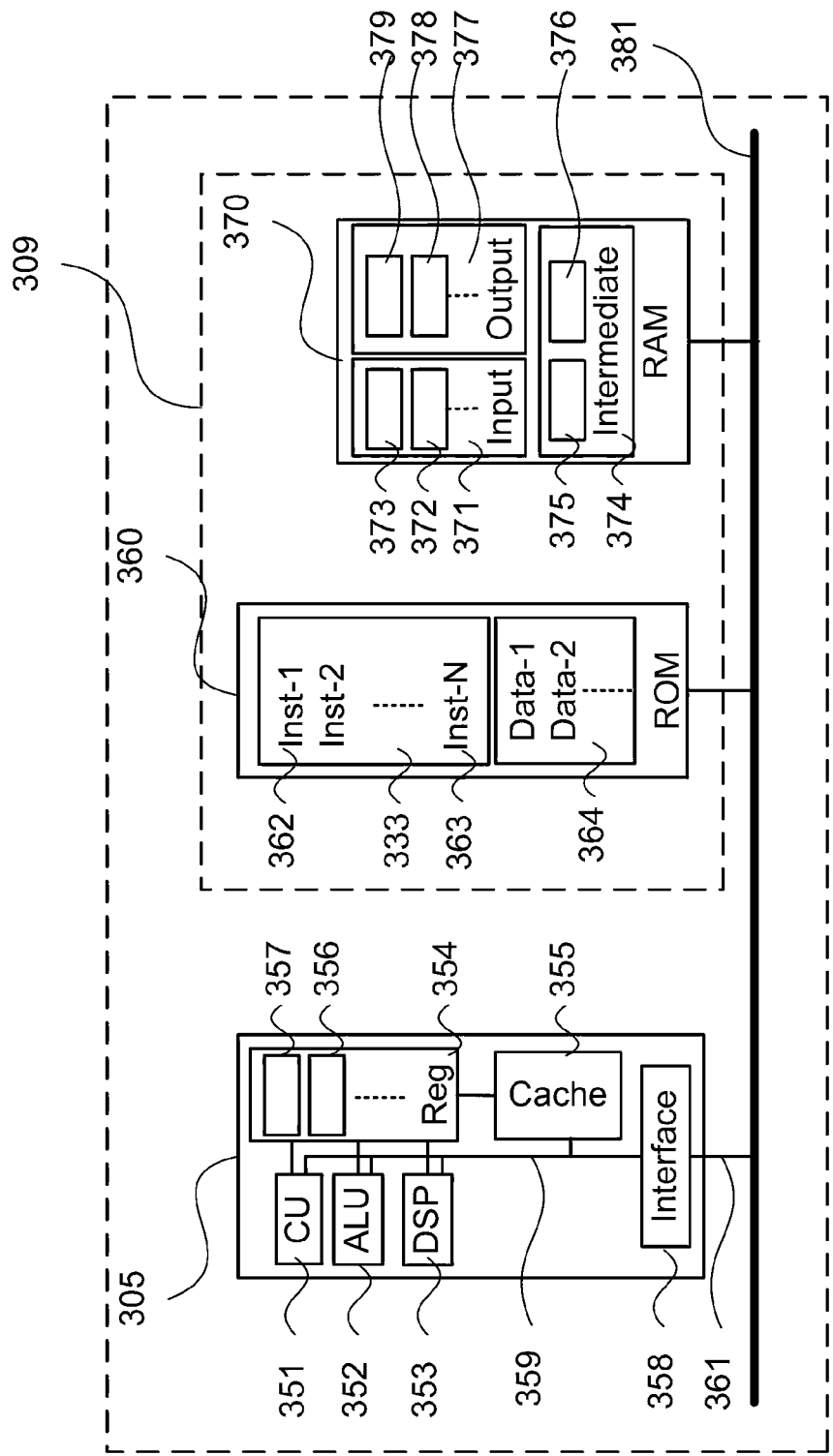

FIGS. 3A and 3B collectively form a schematic block diagram of a general purpose electronic device 301 exemplifying a user device 100. The electronic device 301 may be, for example, a mobile phone, a portable media player or a digital camera, in which processing resources are limited. Nevertheless, the methods to be described may also be performed on higher-level devices such as desktop computers, server computers, and other such devices with significantly larger processing resources.

As seen in FIG. 3A, the electronic device 301 comprises an embedded controller 302. Accordingly, the electronic device 301 may be referred to as an "embedded device." In the present example, the controller 302 has a processing unit (or processor) 305 which is bi-directionally coupled to an internal storage module 309. The storage module 309 may be formed from non-volatile semiconductor read only memory (ROM) 360 and semiconductor random access memory (RAM) 370, as seen in FIG. 3B. The RAM 370 may be volatile, non-volatile or a combination of volatile and non-volatile memory.

The electronic device 301 includes a display controller 307, which is connected to a video display 314, such as a liquid crystal display (LCD) panel or the like. The display controller 307 is configured for displaying graphical images on the video display 314 in accordance with instructions received from the embedded controller 302, to which the display controller 307 is connected.

The electronic device 301 also includes user input devices 313 which are typically formed by keys, a keypad or like controls. In some implementations, the user input devices 313 may include a touch sensitive panel physically associated with the display 314 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 3A, the electronic device 301 also comprises a portable memory interface 306, which is coupled to the processor 305 via a connection 319. The portable memory interface 306 allows a complementary portable memory device 325 to be coupled to the electronic device 301 to act as a source or destination of data or to supplement the internal storage module 309. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 301 also has a communications interface 308 to permit coupling of the device 301 to a computer or communications network 320 via a connection 321. The connection 321 may be wired or wireless. For example, the connection 321 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the electronic device 301 is configured to perform some special function. The embedded controller 302, possibly in conjunction with further special function components 310, is provided to perform that special function. For example, where the device 301 is a digital camera, the components 310 may represent a lens, focus control and image sensor of the camera. The special function components 310 is connected to the embedded controller 302. As another example, the device 301 may be a mobile telephone handset. In this instance, the components 310 may represent those components required for communications in a cellular telephone environment. Where the device 301 is a portable device, the special function components 310 may represent a number of encoders and decoders of a type including Joint Photographic Experts Group (JPEG), (Moving Picture Experts Group) MPEG, MPEG-1 Audio Layer 3 (MP3), and the like.

The methods for enabling user to access the ER- and relational-model database management system through the provided API may be implemented using the embedded controller 302, where the processes may be implemented as one or more software application programs 333 executable within the embedded controller 302. The methods for providing API to enable user to access the database management system will not be described in detail herein. The electronic device 301 of FIG. 3A implements these methods. In particular, with reference to FIG. 3B, the methods are effected by instructions in the software 333 that are carried out within the controller 302. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 333 of the embedded controller 302 is typically stored in the non-volatile ROM 360 of the internal storage module 309. The software 333 stored in the ROM 360 can be updated when required from a computer readable medium. The software 333 can be loaded into and executed by the processor 305. In some instances, the processor 305 may execute software instructions that are located in RAM 370. Software instructions may be loaded into the RAM 370 by the processor 305 initiating a copy of one or more code modules from ROM 360 into RAM 370. Alternatively, the software instructions of one or more code modules may be pre-installed in a non-volatile region of RAM 370 by a manufacturer. After one or more code modules have been located in RAM 370, the processor 305 may execute software instructions of the one or more code modules.

The application program 333 is typically pre-installed and stored in the ROM 360 by a manufacturer, prior to distribution of the electronic device 301. However, in some instances, the application programs 333 may be supplied to the user encoded on one or more CD-ROM (not shown) and read via the portable memory interface 306 of FIG. 3A prior to storage in the internal storage module 309 or in the portable memory 325. In another alternative, the software application program 333 may be read by the processor 305 from the network 320, or loaded into the controller 302 or the portable storage medium 325 from other computer readable media. Computer readable storage media refers to any non-transitory tangible storage medium that participates in providing instructions and/or data to the controller 302 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 301. Examples of transitory or non-tangible computer readable transmission media that may also participate in the provision of software, application programs, instructions and/or data to the device 301 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 333 and the corresponding code modules mentioned above may be executed to implement one or more graphical user interfaces (GUIs) to be rendered or otherwise represented upon the display 314 of FIG. 3A. Through manipulation of the user input device 313 (e.g., the keypad), a user of the device 301 and the application programs 333 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 3B illustrates in detail the embedded controller 302 having the processor 305 for executing the application programs 333 and the internal storage 309. The internal storage 309 comprises read only memory (ROM) 360 and random access memory (RAM) 370. The processor 305 is able to execute the application programs 333 stored in one or both of the connected memories 360 and 370. When the electronic device 301 is initially powered up, a system program resident in the ROM 360 is executed. The application program 333 permanently stored in the ROM 360 is sometimes referred to as "firmware". Execution of the firmware by the processor 305 may fulfil various functions, including processor management, memory management, device management, storage management and user interface.

The processor 305 typically includes a number of functional modules including a control unit (CU) 351, an arithmetic logic unit (ALU) 352, a digital signal processor (DSP) 353 and a local or internal memory comprising a set of registers 354 which typically contain atomic data elements 356, 357, along with internal buffer or cache memory 355. One or more internal buses 359 interconnect these functional modules. The processor 305 typically also has one or more interfaces 358 for communicating with external devices via system bus 381, using a connection 361.

The application program 333 includes a sequence of instructions 362 though 363 that may include conditional branch and loop instructions. The program 333 may also include data, which is used in execution of the program 333. This data may be stored as part of the instruction or in a separate location 364 within the ROM 360 or RAM 370.

In general, the processor 305 is given a set of instructions, which are executed therein. This set of instructions may be organised into blocks, which perform specific tasks or handle specific events that occur in the electronic device 301. Typically, the application program 333 waits for events and subsequently executes the block of code associated with that event. Events may be triggered in response to input from a user, via the user input devices 313 of FIG. 3A, as detected by the processor 305. Events may also be triggered in response to other sensors and interfaces in the electronic device 301.

The execution of a set of the instructions may require numeric variables to be read and modified. Such numeric variables are stored in the RAM 370. The disclosed method uses input variables 371 that are stored in known locations 372, 373 in the memory 370. The input variables 371 are processed to produce output variables 377 that are stored in known locations 378, 379 in the memory 370. Intermediate variables 374 may be stored in additional memory locations in locations 375, 376 of the memory 370. Alternatively, some intermediate variables may only exist in the registers 354 of the processor 305.

The execution of a sequence of instructions is achieved in the processor 305 by repeated application of a fetch-execute cycle. The control unit 351 of the processor 305 maintains a register called the program counter, which contains the address in ROM 360 or RAM 370 of the next instruction to be executed. At the start of the fetch execute cycle, the contents of the memory address indexed by the program counter is loaded into the control unit 351. The instruction thus loaded controls the subsequent operation of the processor 305, causing for example, data to be loaded from ROM memory 360 into processor registers 354, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 333, and is performed by repeated execution of a fetch-execute cycle in the processor 305 or similar programmatic operation of other independent processor blocks in the electronic device 301.

A Method for Accessing the Database

Figure 4:
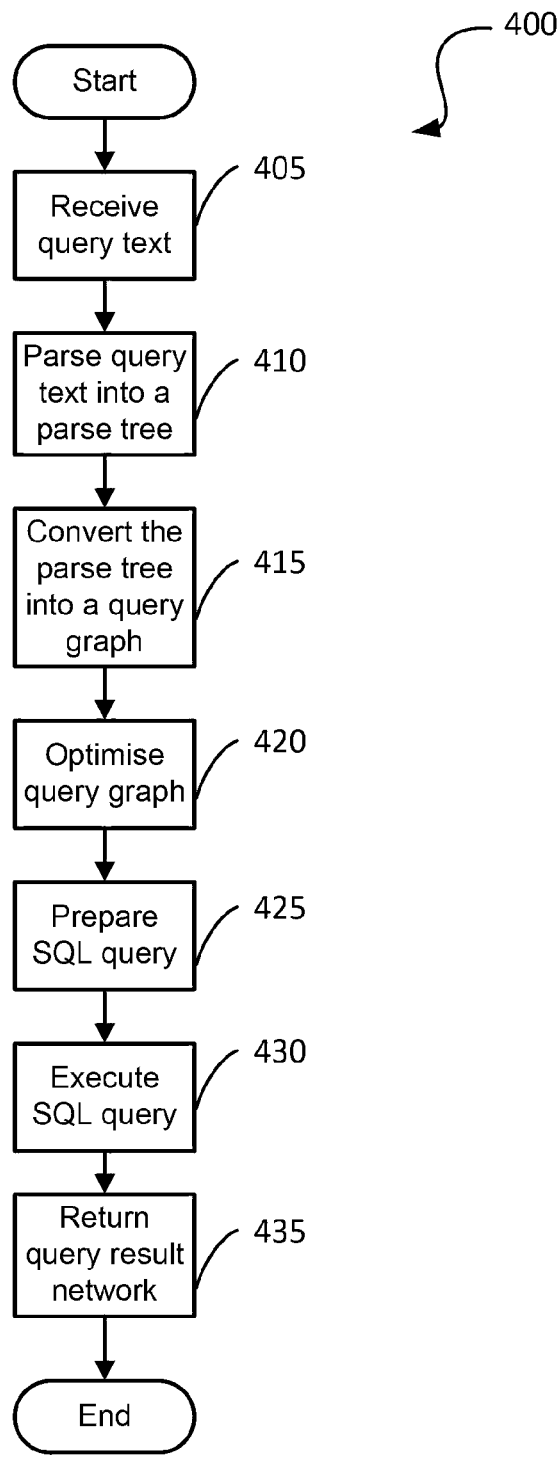
FIG. 4 is a flow diagram of a method of acquiring data from a database according to the present disclosure.

FIG. 4 is a flow diagram of a method 400 for accessing (i.e., updating or retrieving) a combined ER- and relational-model database management system, which is being stored in the database server 108. The method 400 would be executed by the processor 205 of the front end web server 104.

The method 400 commences at step 405 where a query is received to retrieve data fields of entities. The query is received by the processor 205 of the front end web server 104 from the processor 305 of a user device 110. An example of such a query text is "clientname, client-projects.projectname, client-projects.owner.name".

The purpose of the example query text is to acquire the data field of "clientname" from the entities "Client A" 510A, the data field "projectname" from "Project1" 510B and "Project2" 510C, and the data field "name" from "Employee1" 510E. The example query text is an example query language structure. The structure of the query text may be different according to a convention defined by an author of a query language.

In this example, the Extended Backus-Naur Form (EBNF) definition of the query language used is as follows:

```
query :=
    term-list
    // a comma separated list
term-list :=
    assignment* term-chain [',' term-chain]*
    // a dot (or dollar) separated path
term-chain :=
    term-set ['.' term-set]*
```

```
        // a term or group of terms
        term-set :=
            term
            | '{' term-list '}'
        // an individual relationship type or field
        term :=
            '@' identifier
            | relationship
            | field
        assignment :=
            'let' '@' identifier '=' term-set
        relationship :=
            ['-'] entity-ref ['*']
        field :=
            '*' | 'id' | entity-ref
        entity-ref :=
            identifier
            | identifier ':' identifier
            | '#' id-number
        assignment :=
            'let' variable "=" term-set;
        variable := "@" identifier;
        identifier := [a-zA-Z0-9_-]+
```

In the example query text, the query text does not define the root entity instance of the query, as typically the root entity instance is defined independently outside of the query language. For example, the root entity instance can be defined as a parameter in the API, as displayed on the user device 110. By defining the root entity instance independently, less computer processing power is required in processing the query text. Alternatively, a root entity instance can be included in a query text.

The query text starts with the query term of "clientname" to acquire the data field of "clientname" of the entity instance "Client A" 510A. The next query term of "client-projects.projectname" has the terms "client-projects" and "projectname". The term "client-projects" is a relationship type of "client-projects" 580A, which prompts the query language to follow the relationship instance of "client-projects" 520A to the next entity instances 510B and 510C. The subsequent query term of "projectname" refers to the data field 590B and instructs the query language to acquire the data field of "projectname" of the entities "Project1" 510B and "Project2" 510C.

The next query term "client-projects.owner.name" follows, which means that the query language is to follow the relationship instances 520A of relationship-type "client-projects" 580A from the entity instance 510A to entity instances 510B and 510C. The term "owner" prompts the query to follow the relationship instances 520B of relationship type "owner" 580B, from both the entity instances 510B and 510C, to the entity instance "Employee1" 510E and acquire the data field of "name" from the entity instance "Employee1" 510E. If there are more query terms, the query would continue for the remaining relationship type paths.

The query text may also include sub-query expressions. In the example above, a sub-query expression may be "let @p={projectname, owner.name}". Thus, the query text with sub-expressions is: "clientname, client-projects.@p". As shown above, the query text natively references relationship types and data fields to be accessed.

The method 400 then proceeds to step 410.

At step 410, the received query text is parsed into a parse tree. The entity request parsing module 182, as described above, converts the query text into the parse tree, which is an object structure with an ordered rooted tree representing the syntactic structure of a string according to a context-free grammar. The parse tree is also called a parsing tree, a derivation tree, or a concrete syntax tree. The entity parsing module 182 is implemented as one of the internal software modules 140 of the front end web servers 104, as described above.

Figure 6A:
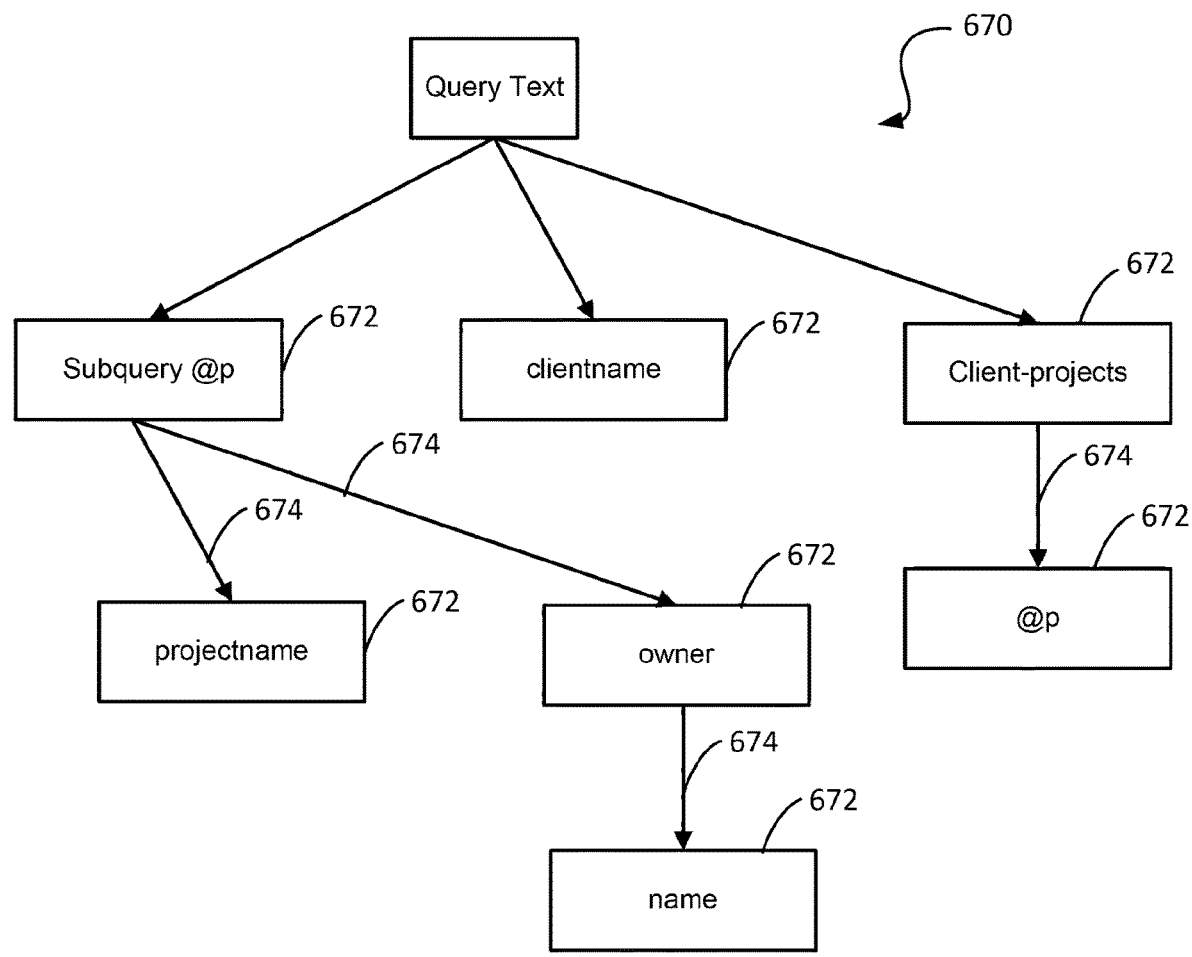
FIG. 6A is an example of a parse tree.

FIG. 6A shows the parse tree 670 of the query text discussed above. The parse tree 670 includes boxes 672 and arrows 674. Each of the boxes 672 represents a query term (e.g., clientname, client-projects, etc.). Each of the arrows 674 represents a term from the parse tree.

The method 400 then proceeds to step 415.

Figure 6B:
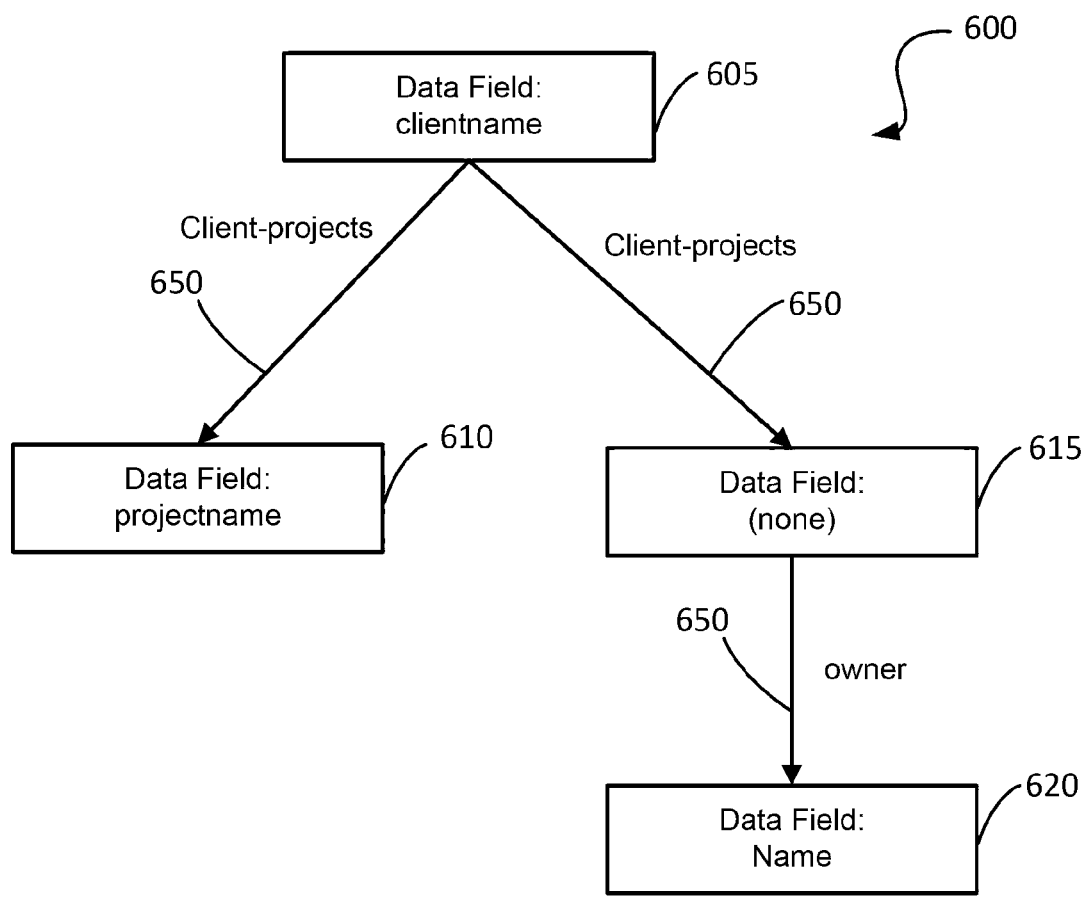
FIG. 6B is an example of a query graph of the parse tree of FIG. 6A.

At step 415, the parse tree is converted into a query graph. FIG. 6B shows an example of a query graph 600 generated from the query text example discussed in relation to the step 405 of the method 400.

The query graph 600, which represents the object structure of the query to be performed, includes nodes 605, 610, 615, and 620 and arrows 650. When processed, each of the nodes 605, 610, 615, and 620 operates over a number of entity instances 510 and identifies a data field or data fields of the entity instances 510 to be acquired. The arrows 650 identifies the relationship type 580 and the relationship instances 520 that should be followed by any of the nodes 605, 610, and 615 according to the query text received at step 405.

In the above query text example, the node 605 is applied to the entity instance "Client A" 510A and acquires the data field of "name" of the entity instance "Client A" 510A. For the query term "client-projects.projectname" the node 605 then follows the relationship instances 520A of relationship type "client-projects" 580A so that the next node 610 identifies the entity instances "Project1" 510B and "Project2" 510C. The node 610 also identifies that the data fields of "projectname" 590B of the entity instances "Project1" 510B and "Project2" 510C are to be acquired.

For the query term "client-projects.owner.name," the node 605 follows the relationship instances 520A of relationship type "client-projects" 580A to the next node 615. The query then follows the relationship instances 520B of relationship type "owner" 580B to the node 620, which identifies the entity instance "Employee1" 510E. The node 620 also identifies that the data field of "name" 590C of the entity instance "Employee1" 510E is to be acquired.

The method 400 then proceeds to step 420.

Figure 7A:
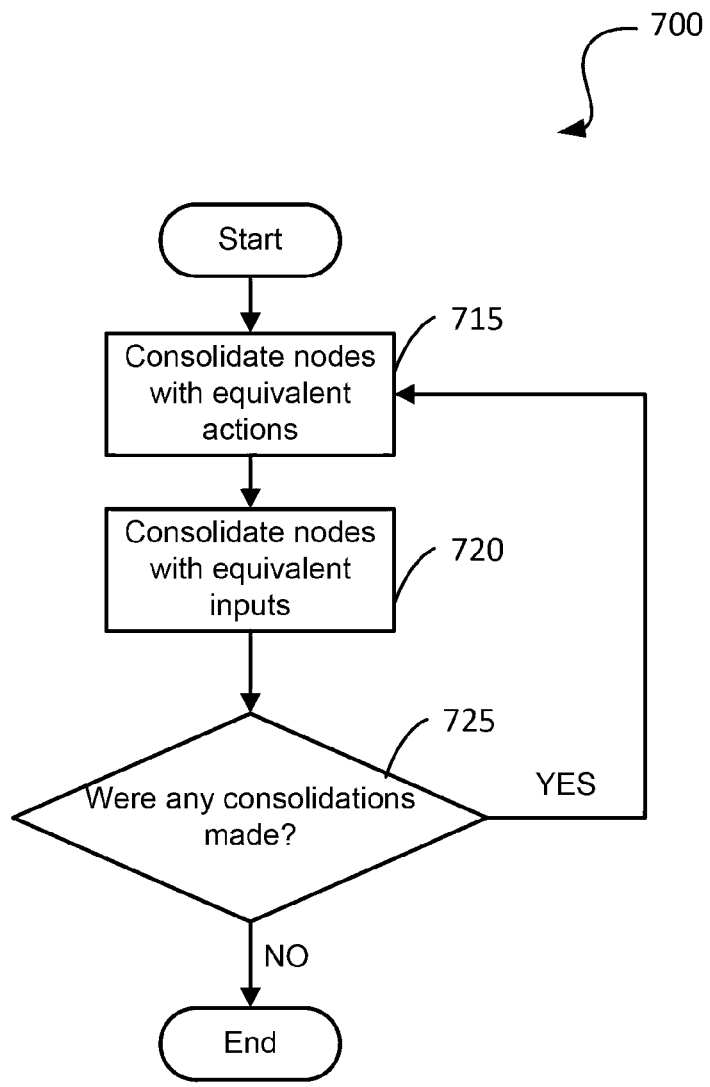
FIGS. 7A to 7C show a flow diagram of a method for optimising the query graph.

At step 420, the query graph is optimised. FIG. 7A shows a method 700 for optimising the query graph. The method 700 starts at step 715 where the nodes 605, 610, and 615 of the query graph 600 are consolidated based on equivalent actions or incoming relationship types. For example, if a first node and a second node are instructed to access the data field of the same entity instance, then the first and second nodes can be combined. In another example, if a first node and a second node have the same incoming relationship type, then the first and second nodes can be combined.

To illustrate the optimisation method 700, the following alternative example query text is used:
"projectname,
owner.email,
owner.department.name,
reviewer.email,
reviewer.department.name"

The alternative query text shown in the paragraph above is applied to the entity instance "Project1" 510C of the ER-model 500. The query text starts with the query term of "projectname" to acquire the data field of "projectname" of the entity instance "Project 2" 510C. The next query text is "owner.email", which leads the query to follow the relationship instances 520B of relationship type "owner" 580B to the next entity instance "Employee1" 510E. The subsequent query term of "email" instructs the query language to acquire the data field of "email" 590E from the entity instance "Employee1" 510E.

The query term "owner.department.name" follows, which means that the query is to follow the relationship instances 520B of relationship-type "owner" 580B and the instances 520F of relationship-type "department" 520F, which lead to entity instance "Department1" 510H and acquire the data field of "name" 590D from the entity instance "Department1" 510H.

The query term "reviewer.email" follows, which means that the query language is to follow the relationship instances 520C of relationship-type "reviewer" 580C to the entity instance "Employee3" 510G and acquire the data field of "email" 590E from the entity instance "Employee3" 510G.

The query term "reviewer.department.name" follows, which means that the query language is to follow the relationship instances 520C of relationship-type "reviewer" 580C and the relationship instances 520F of relationship-type of "department" 580F to the entity instance "Department2" 510I and acquire the data field of "name" 590D from the entity instance "Department2" 510I.

Figure 9:
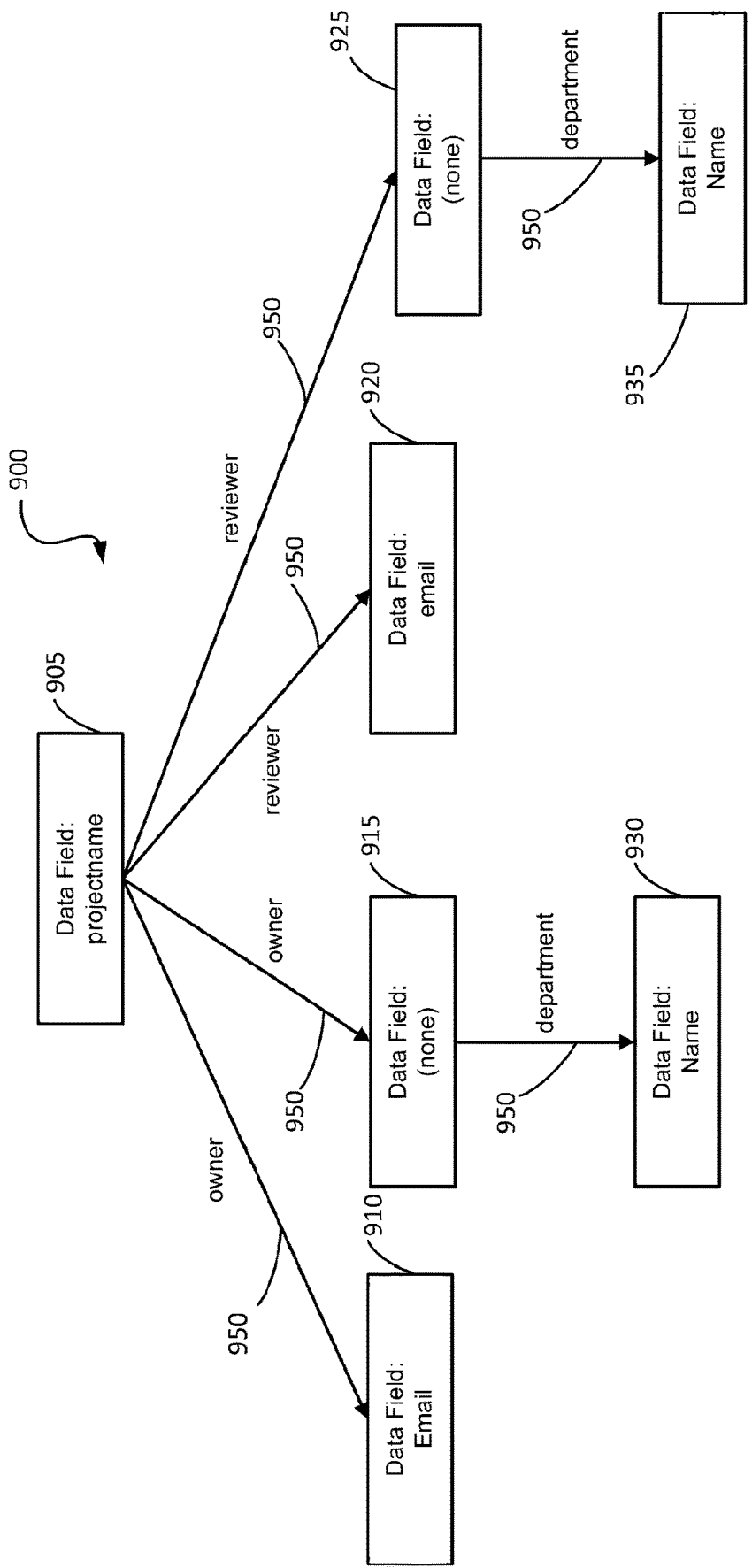
FIG. 9 is an example of a query graph.

The alternative query text is processed by the steps 410 and 415 of the method 400 to obtain the query graph 900 (shown in FIG. 9).

Figure 7B:
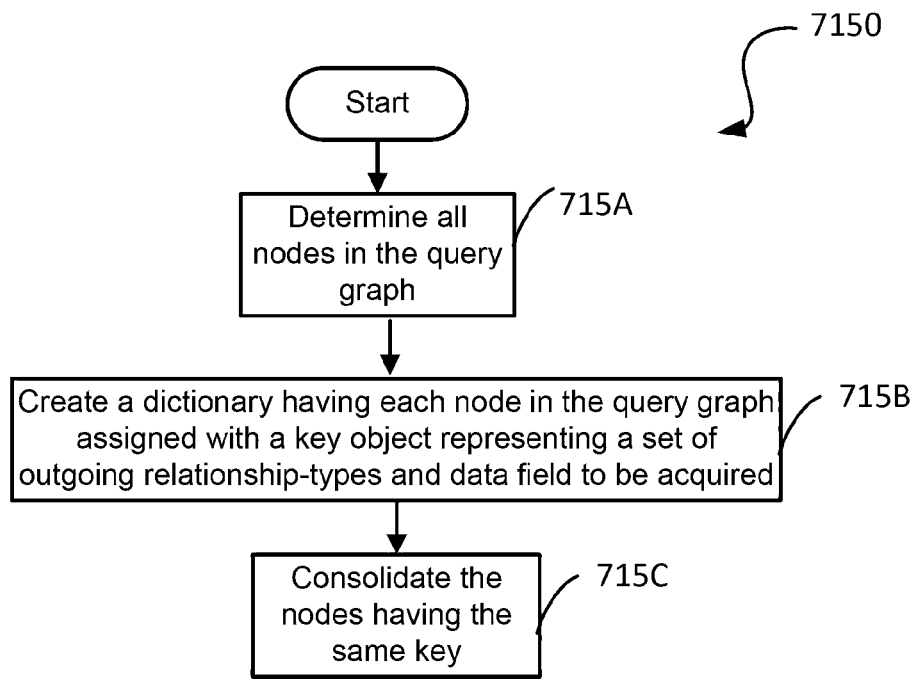

One example implementation of performing the consolidation process of step 715 is shown in the method 7150 of FIG. 7B.

The method 7150 starts at step 715A where each node (i.e., 605, 610, 615, and 620 in the query graph 600; or 905, 910, 915, 920, 925, 930, and 935 in the query graph 900) in the query graph 600 or 900 is analysed. The nodes (i.e., 605, 610, 615, and 620 in the query graph 600; or 905, 910, 915, 920, 925, 930, and 935 in the query graph 900) can be analysed using a graph-walk method e.g., depth-first search algorithm, breadth-first search algorithm and the like. The analysis for each node (i.e., 605, 610, 615, and 620 in the query graph 600; or 905, 910, 915, 920, 925, 930, and 935 in the query graph 900) includes determining the outgoing relationship type and the data field to be acquired for each node. The method 7150 then proceeds to step 715B.

At step 715B, a dictionary is created where a key object is created for each node (i.e., 605, 610, 615, and 620 in the query graph 600; or 905, 910, 915, 920, 925, 930, and 935 in the query graph 900). Each key object represents a unique set of outgoing relationship type and data field to be acquired in each node. FIG. 10A shows an example of a dictionary 1000A created for the query graph 900.

Step 715B proceeds to step 715C where the nodes having duplicate keys are consolidated. FIG. 10B shows an example of a dictionary 1000B where entries in the dictionary 1000A with the same key have been consolidated. Thus, nodes 910 and 920 have been consolidated. Similarly, nodes 915 and 925; and nodes 930 and 935 have been consolidated.

Figure 10C:
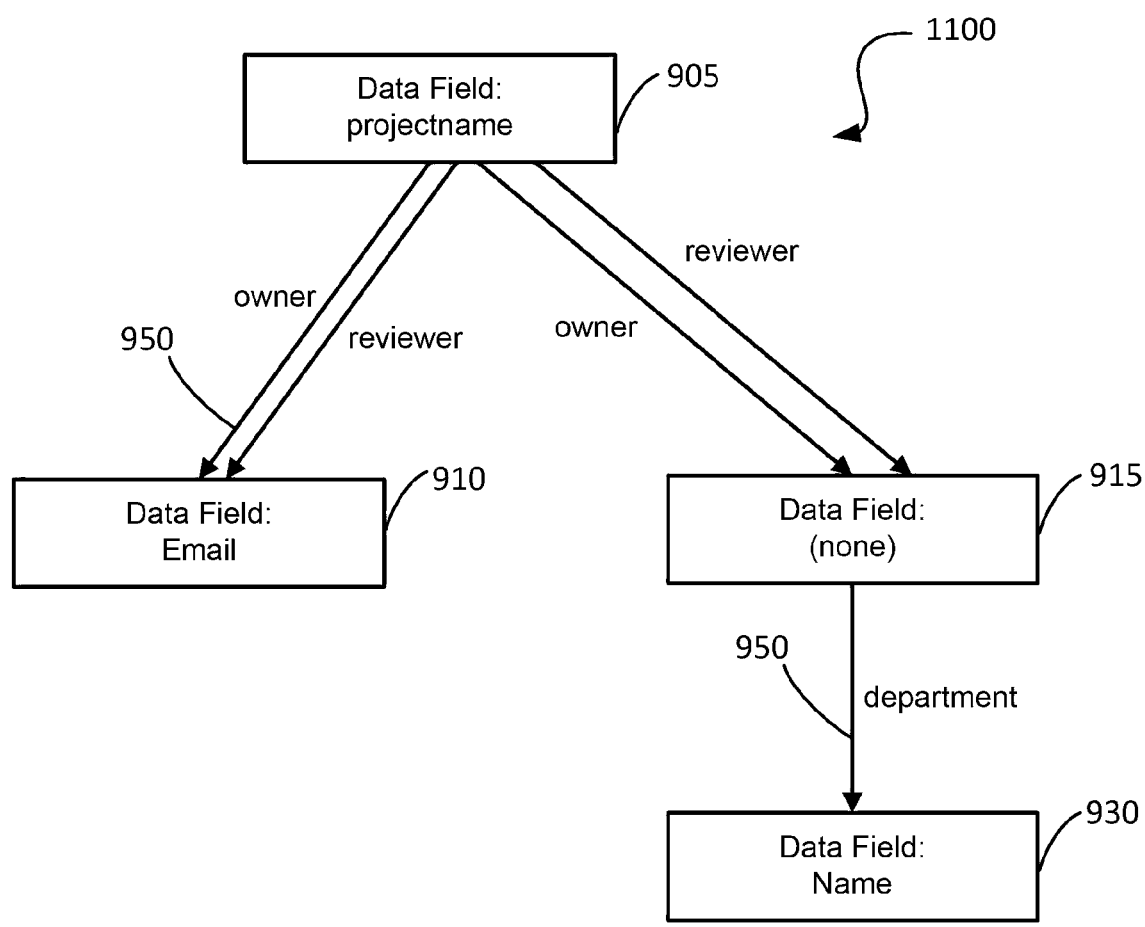
FIG. 10C is an example of a query graph of FIG. 9 after optimisation.

FIG. 10C shows a query graph 1100, which is the consolidated query graph 900. The method 7150 concludes and the method 700 proceeds to step 720.

At step 720, nodes (i.e., 605, 610, 615, and 620 in the query graph 600; or 905, 910, 915, 920, 925, 930, and 935 in the query graph 900) with equivalent inputs and data field are consolidated.

Figure 7C:
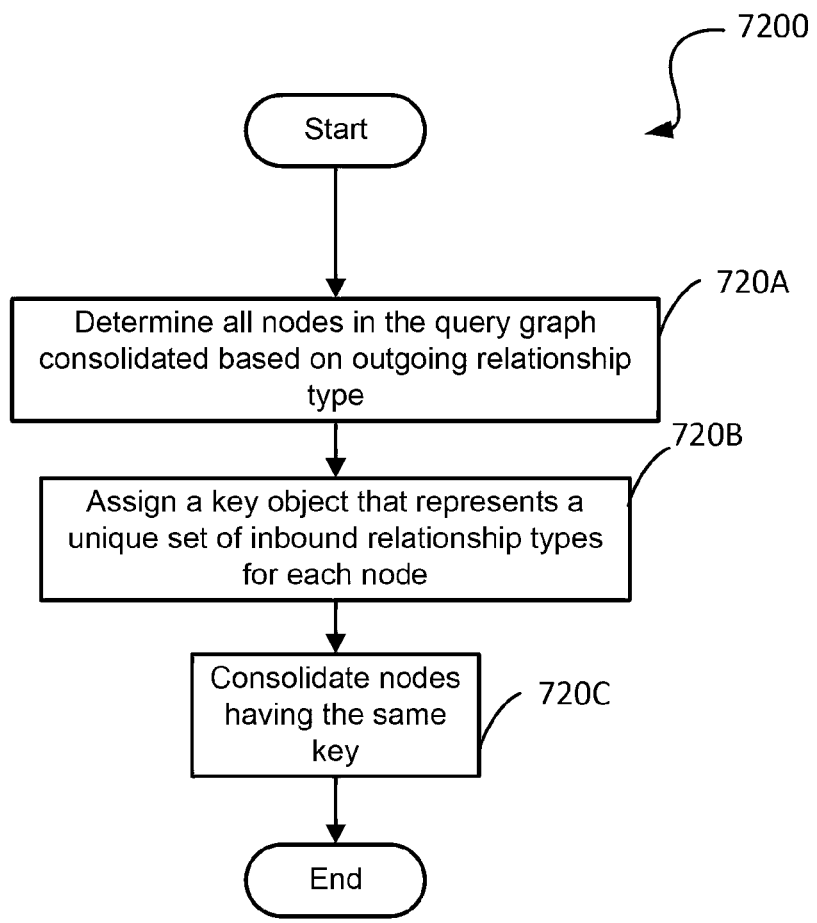

One example implementation of consolidating the nodes (i.e., 605, 610, 615, and 620 in the query graph 600; or 905, 910, 915, 920, 925, 930, and 935 in the query graph 900) is shown in the method 7200 of FIG. 7C. The method 7200 starts at step 720A where each node 905, 910, 915, and 930 of the consolidated query graph 1100 is analysed. The method 7200 then proceeds to step 720B.

Figure 11A:
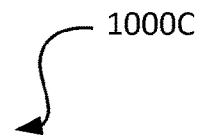
FIG. 11A and FIG. 11B are example tabular representations of a second optimisation process being applied to the query graph of FIG. 10C.

At step 720B, the dictionary 1000B is amended to include key objects corresponding to nodes 905, 910, 915, and 930 in the query graph 1100. Each key object represents a unique set of inbound relationship type in each node 905, 910, 915, and 930. FIG. 11A shows an example of a dictionary 1000C, which is an amended dictionary 1000B, showing the inbound relationship type for each node 905, 910, 915, and 930.

Figure 11B:
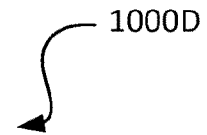

Step 720B proceeds to step 720C where the nodes having the same key are consolidated. The data fields to be acquired in a consolidated node are the data fields to be acquired from each of the consolidated nodes. FIG. 11B shows a dictionary 1000D where entries in the dictionary 1000C with the same key have been consolidated. Thus, nodes 910 and 915 have been consolidated.

Figure 11C:
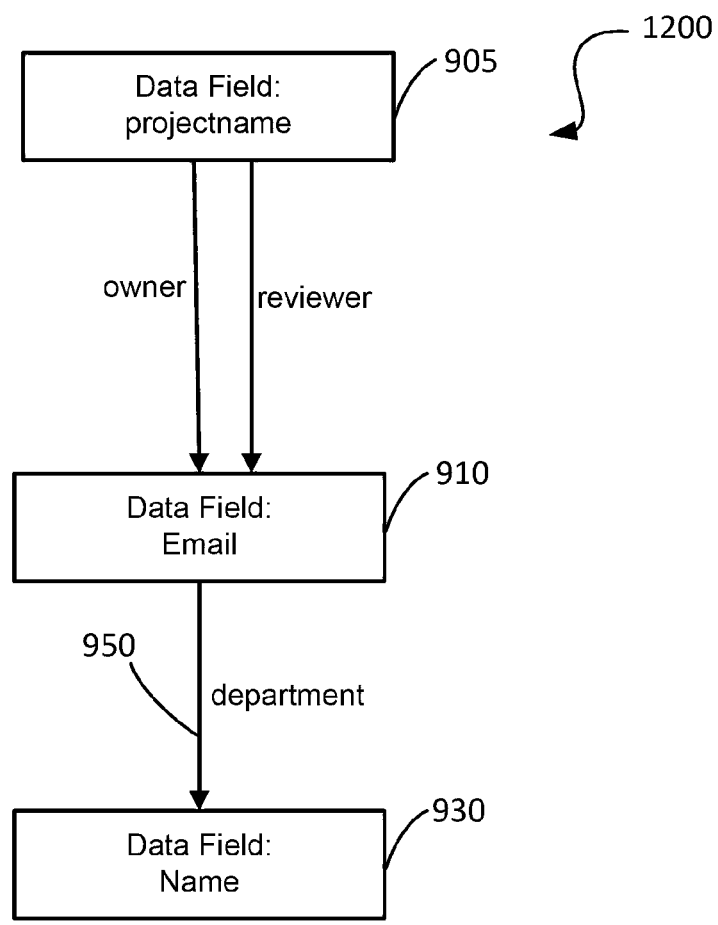
FIG. 11C is an example of a query graph of FIG. 10C after the second optimisation.

FIG. 11C shows a query graph 1200, which is the consolidated query graph 1100. The method 7200 concludes and the method 700 proceeds to step 725.

At step 725, the method 700 determines whether any consolidations were made at steps 715 and 720. If any consolidations are made (YES), then the method 700 returns to step 715. Otherwise (NO), the method 700 concludes, which also concludes step 420. The method 700 is repeated if consolidations have been made in order to ensure that there are no further optimisations possible.

In summary, the query graph 600 or 900 is optimised at the step 715 of the method 700 to produce the query graph 1100 of FIG. 10C. The query graph 1100 is then further optimised at the step 720 of the method 700 to produce the query graph 1200. If at step 725, it is determined that there are further consolidations to be made, the query graph 1200 is further optimised by repeating the optimisations at the steps 715 and 720 of the method 700.

The method 400 then proceeds to step 425.

At step 425, an SQL query is prepared. The SQL query is prepared by generating a table of data that represents a state machine. The SQL query mechanism operates by treating the consolidated query graph 1200 as a state machine and using the set-based operation of SQL servers to simultaneously follow all paths in the query graph 1200. The generated SQL query mechanism also enables the SQL queries to be performed in a single batch call such that round trips are not required. However, multiple data fields are returned.

A state machine is a mathematical structure for determining if a sequence of tokens matches a set of rules. The state machine defines a set of states, and transitions between those states. Each time a token is encountered, the state machine attempts to follow a transition that matches that token from the current state to a subsequent state.

FIG. 8A shows a method 800 for preparing the state machine rules for the SQL query mechanism. The method 800 commences at step 805 where all the nodes 905, 910, and 930 of the query graph 1200 are analysed and assigned a unique identifier. For example, all the nodes 905, 910, and 930 may be analysed using a breadth first graph walk, or other algorithms, so that a unique identifier (e.g., a number) can be assigned to each node 905, 910, and 930. The method 800 then proceeds to step 810.

At step 810, an SQL query is defined. The SQL query may define a temporary working table that also functions to hold a result set.

For example, the working table defines the following:
1. The entity instance (e.g., 510C, 510A, etc.) to be processed.

2. The node (e.g., 905) relating to the entity instance (e.g., 510C) to be processed.
3. A flag indicating if the entity instance (e.g., 510C) has been processed
4. The relationship type (e.g., 580A, etc.) followed to arrive at that entity instance (e.g., 510C), if any.
5. The source entity instance (e.g., 510A) that led to the entity (e.g., 510C) being processed, if any.

The method 800 then proceeds to step 815.

At step 815, the inbound and outgoing relationship types, source node, target node(s), and data fields to be accessed for each node 605, 610, and 615 are converted to a table-valued parameter, ready to be input into the SQL query. The fields to be loaded for each node 605, 610, 615 are similarly converted to a table-valued parameter (i.e., a table of field rules).

Thus, the table-valued parameters codify, for each node 605, 610, and 615 in the query graph 600, the unique identifier, the source node, the relationship type(s), the target node(s), and the data field to be accessed. The relationship type(s) being identified are forward and reverse relationships. For example, for the entity instance "Project 2" 510C of ER model 500, the forward relationship types are relationship types "depends-on" 580D, "owner" 580B, and "reviewer" 580C leading to entity instances "Project3" 510D, "Employee1" 510E, and "Employee3" 510G, respectively. The reverse relationship types are relationship types "depends-on" 580D and "client-projects" 580A from the entity instances "Project1" 510B and "Client A" 510A, respectively.

A table-valued parameter codifying inbound and outgoing relationship types, a source node, and a target node to be accessed for each node of the optimised query graph is called a table of state transition rules.

A table-valued parameter codifying the data fields to be accessed for each note is called a table of field rules.

In a case where data fields are stored across multiple tables, for example if there is one table per data field type, then the data fields are accessed on a per-data field-table basis.

The above codified information may be stored in a table external to the SQL query mechanism. Alternatively, the codified information may be stored in a table-value constructor of the text of the generated SQL mechanism. In another alternative implementation, the codified information may be stored in a permanent database table and accessed by the SQL query mechanism as required. In another alternative implementation, the codified information may be written inline into a generated SQL query.

The same form of query may be executed multiple times, but starting from a different root entity instance. The same query text yields the same SQL query mechanism, regardless of starting instance. Therefore, the SQL query mechanism can and should be cached to enable the SQL database server 108 to perform its own execution plan caching more effectively as well.

A standard caching strategy may be employed. A cache key is calculated to uniquely identify a query text to enable the front end server 104 to check the cache for the same key value before building a SQL query mechanism. If a cached SQL query mechanism for the query text is found, then the cached SQL query mechanism is returned. Otherwise, the SQL query mechanism is created using the method 800 and caches it by the same key. The front end server may then issue the SQL query to the database server 108.

As the SQL query mechanism is being prepared, any data fields or relationship types that are encountered are recorded.

A watch is then scheduled to monitor for any schema changes to those data field definitions or relationship type definitions in the entity-relationship schema. If any such modifications are detected then the cache entry is invalidated such that any subsequent calls cause a new SQL query mechanism to be prepared.

The cache key for the query may be an identity that represents the query; or a hash of the query text; or the object reference for the query; or the entirety of the query text itself.

The SQL query mechanism returns several tables of data in a single call. For example, the SQL query mechanism returns all relationship instances in a first table and all data fields in a second table.

The results acquired from the query can also be cached. A standard caching mechanism is employed that uses a combination of the same cache key used for the cached SQL query mechanism and the identities of the entity types that are used to run the query.

Cache invalidation is performed by any of the following methods:
1. Invalidating if any data change is made.
2. Watching for changes to any data field on any entity instance, where the field definition matches one used in the query; and watching for changes to any relationship instances on any entity instance, where the relationship type matches one used in the query.
3. Watching for changes to any of the entities returned by the query, including relationship instances in or out.
4. Watching for changes to applicable fields and relationship instances on entities returned by the query.

These variants allow for varying cache behaviours with increasing granularity to maximise cache longevity, traded off against increasing overhead.

If a cache is used, then steps 420 to 430 of the method 400 may be skipped and the cached SQL query mechanism is used to access the requested data field.

The method 800 concludes, which also concludes step 425 of the method 400. The method 400 then proceeds to step 430 in which the SQL query mechanism is executed by the processor 205 of the front end web server 104 in communication with the database server 108In operation, the step 430 is performed by pre-filling a working set table with the entity instances (e.g., 510A) that the user device 110 has requested to start with, which may be any entity instances 510 in the database 500. As described above, such a request is received at the server 104 at step 405 of the method 400.

The working set table is then used to perform an iterative loop to follow all nodes 905, 910, and 930 in the query graph 1200 by tracking the nodes 905, 910, and 930 that have been processed. This is achieved as follows:
1. The working set table is filtered to only include yet-to-be-processed nodes (e.g., 910 and 915, if node 905 of the query graph 1200 has been processed).
2. The working set table is joined to the relationship type transition rules table that has been created by connecting the node of the working set table to the source node of the relationship type transition rules table.
3. The working set entity instance identities and the transition rules relationship type identities are then together joined to the entity model relationship instance table.
4. This set operation simultaneously yields: all directly related entity instances across all relationship types identified in the transition rule for all to-be-processed entities given the node that those entities are currently at.

5. Moreover, the join from step 30 also yields the next node for each of related entity instances via the target node identity of the transition rules table. The transition rules table also contains the relationship type identity that is used to arrive at this node.

6. This result set is then joined back against the result set (working set) of entities to filter out any instances that have already been processed. This is to ensure that each entity-id-node-id pair is only visited once, i.e. that the data for any given instances is only loaded once for any given query node, to ensure that the system does not end up in an infinite loop.

7. The query graph may follow some relationship types in the forward direction, and some relationship types in the reverse direction. Because the different columns are involved (namely, relationship FromEntity and ToEntity are reversed), it is convenient to have a relationship type transition table for the forward direction, and a separate relationship type transition table for the reverse direction. Steps 1-6 are repeated once for the forward relationship type transitions and once for the reverse relationship type transitions following the same pattern except with FromEntity and ToEntity reversed.

8. The results from steps 1-7 are inserted back into the result set. The new entity identity is the entity instance at the other end of the relationship instance, the new node identity is the target node identity from the transition table. The relationship type identity is the type of relationship that was followed. The previous set of rows in the working set table is marked as complete, and the new set of rows becomes the work to do on the next iteration.

9. If any actual relationship instances were successfully followed, then control returns to step 1.

10. The result set is further joined to the field rules table-valued parameter and the field data table such that the field data for each entity instance is returned where an entity instance was loaded for a particular node and the field rules table codifies that a particular field should be returned for that node. The step 430 is complete.

There are many possible implementation specific variants such as the specific ordering of the table joins, or whether forward and reverses are processed simultaneously, or whether a two-state or three state flag is used to keep track of progress, or whether the above steps are performed in a single insert statement, or as multiple statements. These possible implementations do not affect the operation of the step 430 because the query is represented in a table of state-machine transition rules, so that work can be processed iteratively as subsequent relationship instances are followed. However, all entity and relationship instances currently available for processing are done so simultaneously at each stage of processing.

The entity instances to be accessed by the prepared SQL query are then identified. Such identifications are performed by applying the state machine technique to iteratively follow relationship instances according to the relationship type transition rules table. The entity instances identified in each iteration are simultaneously processed in the subsequent iteration.

The working set now contains all entity instances that were visited in the result, along with the type of relationship along which the entity instances was reached, and the node identities for which query rules applied. The resulting data, including the working set and the field values are returned from the SQL server 108.

The method 400 then proceeds to step 435.

At step 435, the database server 108 returns a query result network to the user device 110. The query result network is produced from the execution of the query text. The query result network is formatted from the relationship instances returned from the SQL database, with the field data attached to each entity instance node. The query result network is returned to the processor 205 of the front end web server 104, which forward the returned query result network to the API of the user device 110 that requested the data field. That is, the requested data fields of the entity instances are loaded according to the relationship type transition table.

Figure 12A:
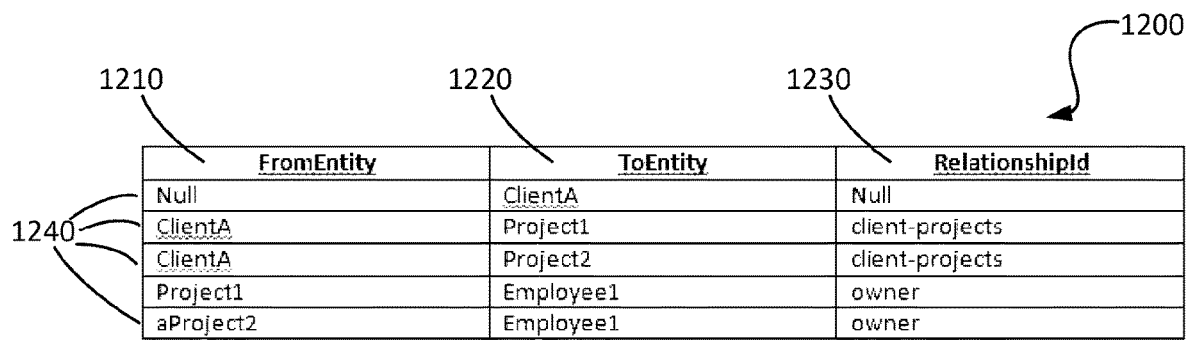
FIG. 12A is an example of the relationship type data returned by executing the method of FIG. 4.

FIG. 12A shows an example of the relationship instance data 1200 which results from executing the query text (received at step 405) on the ER-model 500, starting at the entity instance 510A. The relationship instance data 1200 includes a FromEntity column 1210, a ToEntity column 1220, and a RelationshipID column 1230. Each row 1240 of the data 1200 describes the relationship between columns 1210 to 1230. For example, the first row 1240 includes the FromEntity column with the data "Null", the ToEntity column with the data "ClientA", and the RelationshipID column with the data "Null". Thus, the first row 1240 identifies that the "ClientA" does not have an originating entity instance (i.e., "Null") and a relationship instance from the originating entity instance (i.e., "Null").

Figure 12B:
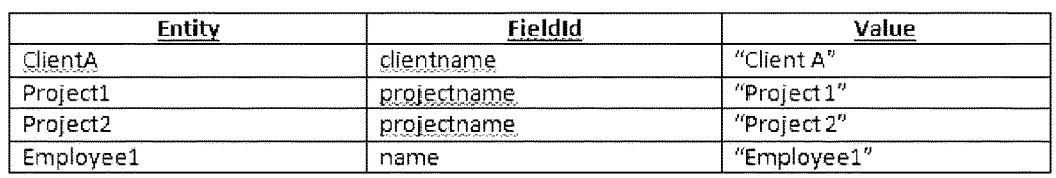
FIG. 12B is an example of the field data returned by executing the method of FIG. 4.
Figure 12C:
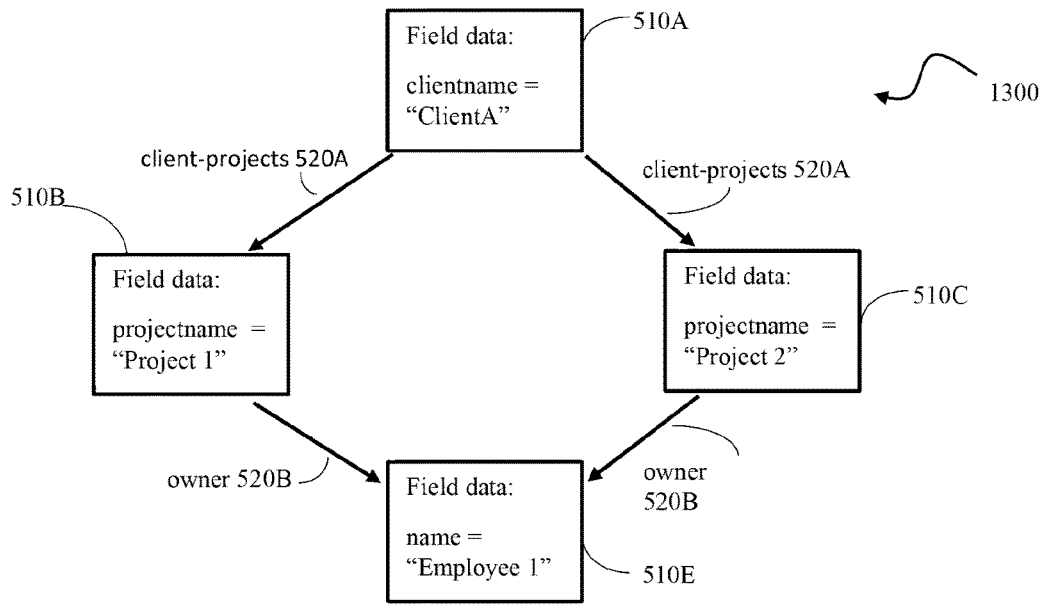
FIG. 12C is an example query result network returned by executing the method of FIG. 4.

FIG. 12B shows an example of the field data 1250 which results from the same query. Thus, as shown in FIG. 12B, the entity instance "ClientA" returns the field data of clientname with the value "Client A". The relationship instance data 1200 is formatted into a query result network 1300 (shown in FIG. 12C) by translating each relationship instance row 1240 into a directed connection (arrow) in the result network 1300, leading from the 'From Entity' to the 'To Entity'. The relationship type is also stored on each edge in the network 1300. The field data 1250 is attached to each entity instance 510 in the query result network by attaching each field value in the field data 1250 to the entity instance specified in each row 1240.

INDUSTRIAL APPLICABILITY

The arrangements described are applicable to the computer and data processing industries and particularly for accessing data fields of an entity-relationship database that is implemented over a SQL relational database management system.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

Appendix A

```
-- Set up working set table
create table #workingSet (
    EntityId int not null,
    NodeId int not null,
    Flag int not null,
    RelationshipId nvarchar(100) not null,
    SourceEntityId int not null
)
alter table #workingSet add primary key (EntityId, NodeId, SourceEntityId,
RelationshipId)
-- Pre fill it with data from an entity parameter
insert into #workingSet select @entityId,1,1,null,null
-- Iterative loop
declare @count int = 1
while @count>0
begin
    -- Follow forward relationships
    insert into #workingSet (EntityId, NodeId, Flag, SourceEntityId, RelationshipId)
        select distinct r.ToEntity, t.NextNodeId, 0, r.FromEntity, r.TypeId
            from #workingSet p
            join
                -- table-value constructor of relationship transition rules
                (values (1, 'depends-on', 1), (1, 'owner', 2) )
                    as t(NodeId, RelationshipId, NextNodeId) on p.NodeId = t.NodeId
            join Relationship r on p.EntityId = r.FromEntity and t.RelationshipId = r.TypeId
            where p.Flag = 1
                and not exists (
                    -- Join back to result to avoid already-visited combinations
                    select 1 from #workingSet x
                        where r.ToEntity = x.EntityId
                            and t.NextNodeId = x.NodeId
                            and r.TypeId = x.RelationshipId
                            and r.FromEntity = x.SourceEntityId
                )
    set @count = @@ROWCOUNT
    -- Trivially repeat the above for reverse relationship types, and sum
    @@ROWCOUNT into count
    -- Update flags
    update #workingSet set Flag = Flag + 1 where Flag < 2
end
-- Return relationship results
select SourceEntityId as FromEntity, EntityId as ToEntity, RelationshipId from
#workingSet
-- Return field results (can be trivially repeated for multiple field-type tables)
select f.EntityId as Entity, f.FieldId, f.Value
    from #workingSet p
    join -- table-value constructor of field rules
        (values (1, 'projectname'), (2, 'name') ) as t(NodeId, FieldId)
            on p.NodeId = t.NodeId
    join Field f on p.EntityId = f.EntityId and t.FieldId = f.FieldId
```

The invention claimed is:

1. A method of accessing a network of relationship instances and data field values of a group of entity instances in a combined entity relationship- and relational-model database management system, the method comprising the steps of:
   receiving a query text that natively references relationship types including the network of relationship types and data fields to be accessed;
   parsing the query text into a parse tree;
   converting the parse tree to a query graph;
   optimising the query graph by combining nodes in the query graph, the combined nodes being nodes with equivalent actions or incoming relationship types;
   analysing the nodes in the optimised query graph;
   codifying inbound and outgoing relationship types, a source node, and a target node to be accessed for each node of the optimised query graph into a first table of state transition rules;
   codifying the data fields to be accessed for each node into a second table of field rules;
   preparing a structured query language (SQL) query that includes the first and second tables;
   identifying entity instances to be accessed by the prepared SQL query by applying a state-machine technique to iteratively follow relationship instances according to the first table, wherein entity instances identified in each iteration are simultaneously processed in the subsequent iteration; and
   loading data fields of the identified entity instances according to the second table.

2. The method according to claim 1, wherein the query text includes a sub-query.

3. The method according to claim 1, wherein the optimising step comprises the steps of:
   (a) consolidating nodes of the query graph with equivalent actions;
   (b) consolidating nodes of the query graph with equivalent inputs;
   (c) determining whether any nodes are consolidated; and
   (d) in response to determining that any consolidations are made, return to step (a).

4. The method according to claim 3, wherein step (a) comprises the steps of:
building a dictionary of all nodes in the query graph;
keying the dictionary using an object that represents a unique set of outgoing relationship types and fields; and
consolidating nodes having a duplicate key.

5. The method according to claim 3, wherein step (b) comprises the step of:
building a dictionary of all nodes in the query graph;
keying the dictionary using an object that represents a unique set of inbound relationship types for that node; and
consolidating nodes having a duplicate key.

6. A non-transitory computer readable medium comprising program instructions for causing a computer to perform a method of accessing a network of relationship instances and data field values of a group of entity instances in a combined entity relationship- and relational-model database management system, the method comprising the steps of:
receiving a query text that natively references relationship types including the network of relationship types and data fields to be accessed;
parsing the query text into a parse tree;
converting the parse tree to a query graph;
optimising the query graph by combining nodes in the query graph, the combined nodes being nodes with equivalent actions or incoming relationship types;
analysing the nodes in the optimised query graph;
codifying inbound and outbound relationship types, a source node, and a target node to be accessed for each node of the optimised query graph into a first table of state transition rules;
codifying the data fields to be accessed for each node into a second table of field rules;
preparing a structured query language (SQL) query that includes the first and second tables;
identifying entity instances to be accessed by the prepared SQL query by applying a state-machine technique to iteratively follow relationship instances according to the first table, wherein entity instances identified in each iteration are simultaneously processed in the subsequent iteration; and
loading data fields of the identified entity instances according to the second table.

7. The non-transitory computer readable medium according to claim 6, wherein the query text includes a sub-query.

8. The non-transitory computer readable medium according to claim 6, wherein the optimising step comprises the steps of:
(a) consolidating nodes of the query graph with equivalent actions;
(b) consolidating nodes of the query graph with equivalent inputs;
(c) determining whether any nodes are consolidated; and
(d) in response to determining that any consolidations are made, return to step (a).

9. The non-transitory computer readable medium according to claim 8, wherein step (a) comprises the steps of:
building a dictionary of all nodes in the query graph;
keying the dictionary using an object that represents a unique set of outgoing relationship types and fields, and consolidating nodes having a duplicate key.

10. The non-transitory computer readable medium according to claim 8, wherein step (b) comprises the step of:
building a dictionary of all nodes in the query graph;
keying the dictionary using an object that represents a unique set of inbound relationship types for that node; and
consolidating nodes having a duplicate key.

* * * * *